US012732295B2

(12) United States Patent
Lyu et al.

(10) Patent No.: US 12,732,295 B2
(45) Date of Patent: Sep. 8, 2026

(54) PACKET TRANSMISSION METHOD AND APPARATUS, DEVICE, AND STORAGE MEDIUM

(71) Applicant: HUAWEI TECHNOLOGIES CO., LTD., Shenzhen (CN)

(72) Inventors: Jingfei Lyu, Wuhan (CN); Silvana Rodrigues, Vancouver (CA); Hongliang Su, Wuhan (CN); Hao Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 18/506,388

(22) Filed: Nov. 10, 2023

(65) Prior Publication Data

US 2024/0080122 A1 Mar. 7, 2024

Related U.S. Application Data

(63) Continuation of application No. PCT/CN2022/073839, filed on Jan. 25, 2022.

(30) Foreign Application Priority Data

May 12, 2021 (CN) ......................... 202110518908.1
Jun. 8, 2021 (CN) ......................... 202110639092.8

(51) Int. Cl.
*H04J 3/06* (2006.01)

(52) U.S. Cl.
CPC .......... *H04J 3/0667* (2013.01); *H04J 3/0697* (2013.01)

(58) Field of Classification Search
CPC ...... H04J 3/0638; H04J 3/0667; H04J 3/0688; H04J 3/067; H04J 3/0697; H04J 3/12
See application file for complete search history.

(56) References Cited

U.S. PATENT DOCUMENTS 9,654,242 B2 * 5/2017 Cao ....................... H04J 3/0679
10,574,348 B2 * 2/2020 Seo ....................... H04J 3/0667
(Continued)

OTHER PUBLICATIONS

IEEE Standard for Local and Metropolitan Area Networks, Timing and Synchronization for Time Sensitive Applications, IEEE Std 802.1AS 2020, Jan. 30, 2020, total 421 pages.
(Continued)

*Primary Examiner* — Bailor C Hsu
(74) *Attorney, Agent, or Firm* — WOMBLE BOND DICKINSON (US) LLP

(57) ABSTRACT

This application discloses a packet transmission method and apparatus, a device, and a storage medium, and relates to the field of communication technologies. The method includes: in response to that a second slave port of a network device is invalid or the second slave port does not exist, a second master port of the network device obtains a second dataset, where the second dataset is obtained by modifying a first dataset, and the first dataset includes a timestamp carried in a first clock packet received by a first slave port and data generated by the first slave port based on the first clock packet. The network device sends a second clock packet based on the second dataset through the second master port, where a timestamp carried in the second clock packet is the timestamp carried in the first clock packet.

20 Claims, 10 Drawing Sheets

In response to that a second slave port of a network device is invalid or the second slave port does not exist, a second master port of the network device obtains a second dataset, where the second dataset is obtained by modifying a first dataset, the first dataset includes a timestamp carried in a first clock packet received by a first slave port and data generated by the first slave port based on the first clock packet, the first slave port belongs to a first clock domain, the second master port belongs to a second clock domain, and the first clock domain is different from the second clock domain

801

The network device sends a second clock packet based on the second dataset through the second master port, where a timestamp carried in the second clock packet is the timestamp carried in the first clock packet, and the first clock packet and the second clock packet each include a sync packet or a follow_up packet in the precision time protocol

802

(56) References Cited

U.S. PATENT DOCUMENTS

| | | | | |
|---|---|---|---|---|
| 11,924,314 | B2 * | 3/2024 | Han | H04L 61/2517 |
| 2016/0170439 | A1 * | 6/2016 | Aweya | H04L 69/28 713/401 |
| 2016/0277138 | A1 * | 9/2016 | Garg | H04J 3/0641 |
| 2020/0259896 | A1 * | 8/2020 | Sachs | H04L 63/0428 |
| 2021/0050988 | A1 * | 2/2021 | Fong | H04L 49/354 |
| 2021/0385058 | A1 * | 12/2021 | Guignard | H04L 69/28 |
| 2022/0103335 | A1 * | 3/2022 | Moon | H04L 7/0037 |
| 2022/0149964 | A1 * | 5/2022 | Kang | H04J 3/0685 |
| 2022/0353167 | A1 * | 11/2022 | Mishra | H04L 43/0811 |

OTHER PUBLICATIONS

IEEE Standard for a Precision Clock Synchronization Protocol for Networked Measurement and Control Systems, IEEE Instrumentation and Measurement Society, IEEE Std 1588-2019, Nov. 7, 2019, total 499 pages.

Draft Standard for Local and metropolitan area networks, Timing and Synchronization for Time-Sensitive Applications, Amendment: Hot Standby, P802.1ASdm/D0.2, Mar. 15, 2021, total 47 pages.

Series G: Transmission Systems and Media, Digital Systems and Networks, Packet over Transport aspects Synchronization, quality and availability targets, Series Y: Global Information Infrastructure, Internet Protocol Aspects and Next-Generation Networks, Internet of Things and Smart Cities, Internet protocol aspects Transport Precision time protocol telecom profile for phase/time synchronization with full timing support from the network, ITU-T G.8275.1/Y.1369.1, (Jun. 2016), total 56 pages.

* cited by examiner

| Bit (Bits) 7 6 5 4 | 3 2 1 0 | Octet (Octets) | Offset (Offset) |
|---|---|---|---|
| Major standard organization identity (majorSdoId) | Packet type (messageType) | 1 | 0 |
| PTP minor version (minorVersionPTP) | PTP version (versionPTP) | 1 | 1 |
| Packet length (messageLength) | | 2 | 2 |
| Domain sequence number (domainNumber) | | 1 | 4 |
| Minor standard organization identity (minorSdoId) | | 1 | 5 |
| Flags (flags) | | 2 | 6 |
| Correction field (correctionField) | | 8 | 8 |
| Packet type feature (messageTypeSpecific) | | 4 | 16 |
| Source port identity (sourcePortIdentity) | | 10 | 20 |
| Sequence identity (sequenceId) | | 2 | 30 |
| Control field (controlField) | | 1 | 32 |
| Logarithmic packet time interval (logMessageInterval) | | 1 | 33 |

FIG. 1

| Bit (Bits) 7 6 5 4 3 2 1 0 | Octet (Octets) | Offset (Offset) |
|---|---|---|
| Header (header) | 34 | 0 |
| Origin timestamp (originTimestamp) | 10 | 34 |
| Follow-up information (Follow_Up information) TLV | 32 | 44 |

FIG. 2

| Bit (Bits) 7 6 5 4 3 2 1 0 | Octet (Octets) | Offset (Offset) |
|---|---|---|
| Header (header) | 34 | 0 |
| Origin timestamp (originTimestamp) | 10 | 34 |

FIG. 3

| Bit (Bits) 7 6 5 4 3 2 1 0 | Octet (Octets) | Offset (Offset) |
|---|---|---|
| Header (header) | 34 | 0 |
| Precise origin timestamp (preciseOriginTimestamp) | 10 | 34 |
| Follow-up information (Follow_Up information) TLV | 32 | 44 |

FIG. 4

| Bit (Bits) 7 6 5 4 3 2 1 0 | Octet (Octets) | Offset (Offset) |
|---|---|---|
| TLV type (tlvType) | 2 | 0 |
| Length field (lengthField) | 2 | 2 |
| Organization identity (organizationID) | 3 | 4 |
| Organization subtype (organizationSubType) | 3 | 7 |
| Cumulative scaled rate offset (cumulativeScaledRateOffset) | 4 | 10 |
| Grandmaster time base indicator (gmTimeBaseIndicator) | 2 | 14 |
| Last grandmaster phase change (lastGMPhaseChange) | 12 | 16 |
| Scaled last grandmaster frequency change (scaledLastGmFreqChange) | 4 | 28 |

FIG. 5

PACKET TRANSMISSION METHOD AND APPARATUS, DEVICE, AND STORAGE MEDIUM

CROSS-REFERENCE TO RELATED APPLICATIONS

This application is a continuation of International Application No. PCT/CN2022/073839 filed on Jan. 25, 2022, which claims priority to Chinese Patent Application No. 202110518908.1, filed on May 12, 2021, and Chinese Patent Application No. 202110639092.8, filed on Jun. 8, 2021. All of the aforementioned patent applications are hereby incorporated by reference in their entireties.

TECHNICAL FIELD

This application relates to the field of communication technologies, and in particular, to a packet transmission method and apparatus, a device, and a storage medium.

BACKGROUND

In the institute of electrical and electronics engineers (IEEE) 1588 protocol standard, a set of message-based synchronization protocols is defined in the technical specification. A packet with a timestamp is periodically sent, so that time of each node in a network is corrected, thereby implementing time synchronization of the entire network. The full name of the IEEE 1588 protocol standard is a precision clock synchronization protocol for networked measurement and control systems (IEEE 1588 precision clock synchronization protocol), which is briefly referred to as the precision time protocol (PTP).

For the IEEE 802.1AS-2020 application standard (the IEEE 802.1AS-2020 is also referred to as the generalized precision time protocol (gPTP) defined based on the IEEE 1588 protocol standard, in IEEE 802.1AS-2020, it is defined that each device can support a plurality of 1588 entities, and all entities are distinguished based on different domains. A device that supports the plurality of 1588 entities is referred to as a multi-domain 1588 entity, a multi-domain entity, a multi-domain 1588 device, or a multi-domain device below. Each entity may support a boundary clock (BC) or a grandmaster (GM) clock. Each BC entity includes a slave port and at least one master port, and each GM entity includes at least one master port. In addition, BC entities or GM entities in different domains independently process a 1588 packet.

Currently, the IEEE 802.1AS-2020 protocol standard has been applied to the time sensitive networking (TSN) industrial field and the TSN vehicle-mounted field. In consideration of high reliability requirements in the industrial field and the vehicle-mounted field, it is particularly important to implement that even if a slave port corresponding to a 1588 entity in the plurality of entities is lost, the 1588 entity can still continue to send a 1588 packet that carries precise time from a master port corresponding to the 1588 entity.

SUMMARY

This application provides a packet transmission method and apparatus, a device, and a storage medium, so that when a slave port of a clock domain of a network device is invalid or does not exist, the network device can still send, through a master port, a clock packet that carries precise time.

According to a first embodiment, a packet transmission method is provided. The method includes: In response to that a second slave port of a network device is invalid or the second slave port does not exist, a second master port of the network device obtains a second dataset. The second dataset is obtained by modifying a first dataset. The first dataset includes a timestamp carried in a first clock packet received by a first slave port and data generated by the first slave port based on the first clock packet. The first slave port belongs to a first clock domain, the second master port belongs to a second clock domain, and the first clock domain is different from the second clock domain. The network device sends a second clock packet based on the second dataset through the second master port. A timestamp carried in the second clock packet is the timestamp carried in the first clock packet. The first clock packet and the second clock packet each include a synchronization sync packet or a follow-up follow_up packet in the precision time protocol.

The timestamp is an origin timestamp originTimestamp in the sync packet, or a precise origin timestamp preciseOriginTimestamp in the follow_up packet. The precision time protocol is the precision time protocol (PTP) defined in IEEE 1588 or the generalized precision time protocol (gPTP) defined in IEEE 802.1AS.

The network device can obtain the second dataset by modifying the first dataset, and send the second clock packet based on the second dataset through the second master port. In this way, when a second slave port of the network device is invalid or the second slave port does not exist, the network device can still maintain sending, by using the second master port, the second clock packet that carries precise time, to ensure that the second clock domain continues to transmit the precise time, so as to improve reliability of a communication system.

In a possible implementation, that a second master port of the network device obtains a second dataset includes: The second master port receives the first dataset, and modifies the first dataset based on information about the second clock domain, to obtain the second dataset. The network device receives and modifies, by using the second master port, the first dataset to obtain the dataset that belongs to the second clock domain.

In a possible implementation, an IWF module is included between the second master port and the first slave port. The IWF module is configured to modify the first dataset based on information about the second clock domain, to obtain the second dataset. That a second master port of the network device obtains a second dataset includes: The second master port receives the second dataset sent by the IWF module. The IWF module is added to the network device, and the IWF module may be implemented by using software without additional hardware support. The IWF module receives and modifies the first dataset, to obtain the dataset that belongs to the second clock domain, so as to improve reliability and flexibility of packet transmission.

In a possible implementation, the first dataset includes a domain name domainNumber. The modifying the first dataset based on information about the second clock domain includes: modifying a value of domainNumber to a domain name of the second clock domain of the network device. Because the first dataset is obtained by using the first slave port of the first clock domain, the domain name in the first dataset is a domain name of the first clock domain. The second dataset may be obtained by modifying the domain name of the first clock domain in the first dataset to the domain name of the second clock domain.

In an embodiment, the first dataset includes a domain name domainNumber, a local port number localPortNumber, synchronization receipt time syncReceiptTimeoutTime, a source port identity sourcePortIdentity, and a log message interval logMessageInterval. The modifying the first dataset based on information about the second clock domain includes: modifying a value of domainNumber to a domain name of the second clock domain of the network device; modifying a value of localPortNumber to a first value; modifying a value of syncReceiptTimeoutTime to a second value; modifying a clock identity clockIdentity in sourcePortIdentity to clockIdentity of the second clock domain; modifying a port number portnumber in sourcePortIdentity to a third value; and modifying LogMessageInterval to a time interval at which ClockMaster of the second clock domain sends a packet.

In an embodiment, the network device includes a second switch. That in response to that a second slave port of a network device is invalid or the second slave port does not exist, a second master port of the network device obtains a second dataset includes: In response to that the second slave port is invalid or the second slave port does not exist, the second master port of the network device obtains the second dataset based on control of the second switch and the first dataset corresponding to the first slave port.

In an embodiment, the network device includes the second switch. The method further includes: In response to that the second slave port exists and is valid, and the second slave port belongs to the second clock domain, the second master port of the network device sends a third clock packet based on the control of the second switch and a third dataset corresponding to the second slave port. The third clock packet includes a sync packet or a follow up packet in the precision time protocol.

The network device includes the second switch that can control a manner in which the second master port obtains the second dataset. If the network device has the second slave port that belongs to the second clock domain, when the second slave port exists and is valid, the second master port receives a dataset from the second slave port based on the control of the second switch; and when the second slave port is invalid or the second slave port does not exist, the second master port receives a dataset from the first slave port based on the control of the second switch. In this way, the second master port can be ensured to obtain the second dataset in any case.

In an embodiment, the network device further includes a first switch. A first master port belongs to the first clock domain. The method further includes: In response to that the first slave port exists and is valid, the first master port of the network device sends a fourth clock packet based on control of the first switch and the first dataset corresponding to the first slave port. The fourth clock packet includes a sync packet or a follow up packet in the precision time protocol. In response to that the first slave port is invalid or the first slave port does not exist, and the second slave port exists and is valid, the first master port of the network device sends a fifth clock packet based on the control of the first switch and the third dataset corresponding to the second slave port. The fifth clock packet includes a sync packet or a follow up packet in the precision time protocol.

When the network device has the first master port and the second master port, the first switch and the second switch are used to control manners of sending a clock packet by the first master port and the second master port. Regardless of whether the first slave port is invalid or does not exist, or the second slave port is invalid or does not exist, both the first master port and the second master port can be ensured to send clock packets that carry the precise time.

In an embodiment, before the second master port of the network device obtains the second dataset, the method further includes: The first slave port of the network device receives the first clock packet sent by a third master port, where the third master port is a master port corresponding to the first clock domain of a clock source device of the network device; obtains, based on the received first clock packet, the data generated based on the first clock packet; and generates the first dataset based on the timestamp carried in the first clock packet and the data generated based on the first clock packet.

According to a second embodiment, a packet transmission apparatus is provided. The apparatus includes:

- a first obtaining module, configured to: in response to that a second slave port of a network device is invalid or the second slave port does not exist, obtain, by a second master port of the network device, a second dataset, where the second dataset is obtained by modifying a first dataset, the first dataset includes a timestamp carried in a first clock packet received by a first slave port and data generated by the first slave port based on the first clock packet, the first slave port belongs to a first clock domain, the second master port belongs to a second clock domain, and the first clock domain is different from the second clock domain; and
- a sending module, configured to send a second clock packet based on the second dataset through the second master port, where a timestamp carried in the second clock packet is a timestamp carried in the first clock packet, and the first clock packet and the second clock packet each include a synchronization sync packet or a follow-up follow_up packet in the precision time protocol.

The timestamp is an origin timestamp originTimestamp in the sync packet, or a precise origin timestamp preciseOriginTimestamp in the follow_up packet.

In an embodiment, the first obtaining module is configured to receive, by the second master port, the first dataset, and modify the first dataset based on information about the second clock domain, to obtain the second dataset.

In an embodiment, an IWF module is included between the second master port and the first slave port. The IWF module is configured to modify the first dataset based on the information about the second clock domain, to obtain the second dataset. The first obtaining module is configured to receive, by the second master port, the second dataset sent by the IWF module.

In an embodiment, the first dataset includes a domain name domainNumber. The first obtaining module is further configured to modify a value of domainNumber to a domain name of the second clock domain of the network device.

In an embodiment, the first dataset includes a domain name domainNumber, a local port number localPortNumber, synchronization receipt time syncReceiptTimeoutTime, a source port identity sourcePortIdentity, and a log message interval logMessageInterval. The first obtaining module is further configured to modify a value of domainNumber to a domain name of the second clock domain of the network device, modify a value of localPortNumber to a first value, modify a value of syncReceiptTimeoutTime to a second value, modify a clock identity clockIdentity in sourcePortIdentity to clockIdentity of the second clock domain, modify a port number portnumber in sourcePortIdentity to a third value, and modify logMessageInterval to a time interval at which ClockMaster of the second clock domain sends a packet.

In an embodiment, the network device includes a second switch. The first obtaining module is configured to: in response to that the second slave port is invalid or the second slave port does not exist, obtain, by the second master port of the network device, the second dataset based on control of the second switch and the first dataset corresponding to the first slave port.

In an embodiment, the network device includes the second switch. The second slave port belongs to the second clock domain. The apparatus further includes:

- a first control module, configured to: in response to that the second slave port exists and is valid, send, by the second master port of the network device, a third clock packet based on the control of the second switch and a third dataset corresponding to the second slave port, where the third clock packet includes a sync packet or a follow_up packet in the precision time protocol.

In an embodiment, the network device further includes a first switch. A first master port belongs to the first clock domain. The apparatus further includes:

- a second control module, configured to: in response to that the first slave port exists and is valid, send, by the first master port of the network device, a fourth clock packet based on control of the first switch and the first dataset corresponding to the first slave port, where the fourth clock packet includes a sync packet or a follow_up packet in the precision time protocol; and
- a third control module, configured to: in response to that the first slave port is invalid or the first slave port does not exist, and the second slave port exists and is valid, send, by the first master port of the network device, a fifth clock packet based on the control of the first switch and the third dataset corresponding to the second slave port, where the fifth clock packet includes a sync packet or a follow up packet in the precision time protocol.

In an embodiment, the apparatus further includes:

- a receiving module, configured to receive, by the first slave port of the network device, the first clock packet sent by a third master port, where the third master port is a master port corresponding to the first clock domain of a clock source device of the network device;
- a second obtaining module, configured to obtain, based on the received first clock packet, the data generated based on the first clock packet; and
- a generating module, configured to generate the first dataset based on the timestamp carried in the first clock packet and the data generated based on the first clock packet.

According to a third embodiment, a network device is provided. The network device includes a processor. The processor is coupled to a memory. The memory stores at least one program instruction or code. The at least one program instruction or code is loaded and executed by the processor, to enable the network device to implement any one of the foregoing packet transmission methods.

In an embodiment, there are one or more processors, and there are one or more memories.

In an embodiment, the memory may be integrated with the processor, or the memory and the processor are separately disposed.

In an embodiment, the memory may be a non-transitory memory, for example, a read-only memory (ROM). The memory and the processor may be integrated on a same chip, or may be separately disposed on different chips. A type of the memory and manners of disposing the memory and the processor are not limited in this application.

According to a fourth embodiment, a communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the apparatus is enabled to perform the method in any one of the first embodiment or the possible implementations of the first embodiment.

According to a fifth embodiment, a computer-readable storage medium is provided. The storage medium stores at least one instruction, and the instruction is loaded and executed by a processor, to enable a computer to implement any one of the foregoing packet transmission methods.

According to a sixth embodiment, a computer program (product) is provided. The computer program (product) includes computer program code, and when the computer program code is run by a computer, the computer is enabled to perform the methods in the foregoing embodiments.

According to a seventh embodiment, a chip is provided, including a processor. The processor is configured to invoke, from a memory, instructions stored in the memory and run the instructions, to enable a communication device on which the chip is mounted to perform the methods in the foregoing embodiments.

According to an eighth embodiment, another chip is provided, including an input interface, an output interface, a processor, and a memory. The input interface, the output interface, the processor, and the memory are connected to each other through an internal connection path. The processor is configured to execute code in the memory, and when the code is executed, the processor is configured to perform the methods in the foregoing embodiments.

It should be understood that, for beneficial effects achieved by the technical solutions in the second embodiment and the corresponding feasible implementations in this application, refer to the foregoing technical effects in the first embodiment and the corresponding possible implementations of the first embodiment. Details are not described herein again.

BRIEF DESCRIPTION OF DRAWINGS

FIG. 1 is a schematic diagram of a structure of a PTP packet header according to an embodiment of this application;

FIG. 2 is a schematic diagram of a structure of a sync packet in a one-step mode according to an embodiment of this application;

FIG. 3 is a schematic diagram of a structure of a sync packet in a two-step mode according to an embodiment of this application;

FIG. 4 is a schematic diagram of a structure of a follow up packet according to an embodiment of this application;

FIG. 5 is a schematic diagram of a structure of a Follow_Up information TLV field according to an embodiment of this application;

DESCRIPTION OF EMBODIMENTS

Figure 6:
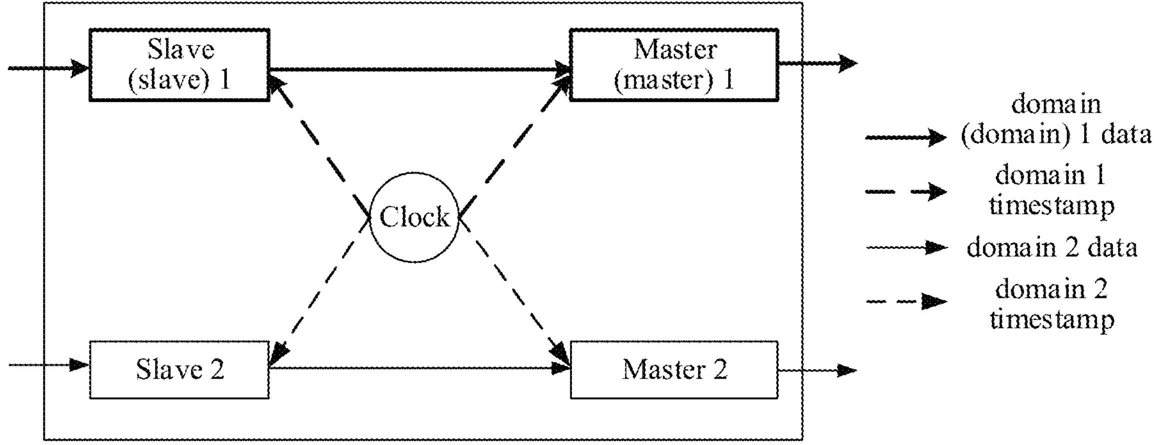
FIG. 6 is a schematic diagram of a structure of a network device according to an embodiment of this application.

To make the objectives, technical solutions, and advantages of this application clearer, the following further describes the implementations of this application in detail with reference to the accompanying drawings.

The IEEE 1588 protocol supports synchronization between a local clock (which is also referred to as a slave clock) of a device (which is also referred to as a slave device) and a clock or time of a GM clock device, so that a distributed communication network can have strict timing synchronization. In an application process, in the IEEE 1588 protocol a set of message-based synchronization protocols is defined in a technical specification. A packet with a timestamp is periodically released, so that a clock or time of each node in the network can be corrected, thereby implementing a synchronous operation of an entire system. For example, sub-microsecond-level synchronization is performed on clocks in a sensor, an enforcer, and a terminal device in a standard Ethernet or another distributed bus system that uses a multicast technology.

The IEEE 802.1AS-2020 application standard defined based on the IEEE 1588 protocol is mainly used in a TSN industrial field, a TSN vehicle-mounted field, and the like. Various PTP packets defined in IEEE 802.1AS-2020 include a PTP packet header. For example, a structure of the PTP packet header is shown in FIG. 1. The PTP packet header includes a major standard organization identity (majorSdoId) field, a packet type (messageType) field, a PTP minor version (minorVersionPTP) field, a PTP version (versionPTP) field, a packet length (messageLength) field, a domain sequence number (domainNumber) field, a minor standard organization identity (minorSdoId) field, a flags field, a correction field (correctionField) field, a packet type feature (messageTypeSpecific) field, a source port identity (sourcePortIdentity) field, a sequence identity (sequenceId) field, a control field (controlField) field, and a logarithmic packet time interval (logMessageInterval) field. The fields in the PTP packet header are described as follows:

Packet type (messageType): Different values indicate different types of PTP packets. versionPTP and minorVersionPTP indicate a version number of the 1588 protocol. If versionPTP is 1 and minorVersionPTP is 0, it indicates that a 1588 packet complies with the IEEE 1588v1 protocol (IEEE 1588-2002). If versionPTP is 2 and minorVersionPTP is 0, it indicates that the 1588 packet complies with the IEEE 1588v2 protocol (IEEE 1588-2008). If versionPTP is 2 and minorVersionPTP is 10, it indicates that the 1588 packet complies with the IEEE 1588v2.1 protocol (IEEE 1588-2019). PTP domain sequence number (domainNumber): A value of the PTP domain sequence number (domainNumber) field is a DS domain name (defaultDS.domainNumber), which is a variable, of a default dataset. Flags: The flags field carries various flags. Correction field (correctionField): Residence time, a link delay, a link asymmetry delay, or the like of the 1588 packet is transmitted. Source port identity (sourcePortIdentity): The source port identity field indicates an identity of a sending port. Sequence identity (sequenceId): The sequence identity field is used to distinguish a plurality of packets of a same type sent by the sending port. Control field (controlField): The control field may be set to 0, or determined by the value of the packet type field. In other words, the value of the control field varies based on the packet type. Logarithmic packet time interval (logMessageInterval): The logarithmic packet time interval (logMessageInterval) field carries a logarithmic time interval for sending packets. Values of logarithmic packet time intervals are logarithms to a base of 2.

As defined in the IEEE 802.1AS-2020 standard, a sync packet is sent by a master port of the GM clock device. Refer to FIG. 2. If the master port is a clock in a one-step mode, a format of the sync packet includes a header field, an origin timestamp (originTimestamp) field, and a follow-up information (Follow_Up information) type-length-value (TLV) field. For a schematic diagram of a structure of the header field in FIG. 2, refer to FIG. 1. The origin timestamp (originTimestamp) field is defined as a value 0 or time when the master port sends the sync packet. In this case, a timestamp sent by the sync packet is carried in originTimestamp of the sync packet. For a schematic diagram of a structure of the Follow_Up information TLV field, refer to FIG. 5. Refer to FIG. 3. If the master port is a clock in a two-step mode, a format of the sync packet includes a header field and an origin timestamp (originTimestamp) field. For a schematic diagram of a structure of the header field in FIG. 3, still refer to FIG. 1. In the two-step mode, originTimestamp information of the sync packet is 0, and actual timestamp information is carried in a precise origin timestamp (preciseOriginTimestamp) of a follow up packet associated with the sync packet. Refer to FIG. 4. A format of a follow up packet includes a header field, a precise origin timestamp (preciseOriginTimestamp) field, and a follow-up information (Follow_Up information) TLV field.

For a schematic diagram of a structure of the header field in FIG. 4, refer to FIG. 1. A schematic diagram of a structure of the Follow_Up information TLV field is shown in FIG. 5. The Follow_Up information TLV field includes a TLV type (tlvType) field, a length field (lengthField) field, an organization identity (organizationID) field, an organization subtype (organizationSubType) field, a cumulative scaled rate offset (cumulativeScaledRateOffset) field, a grandmaster time base indicator (gmTimeBaseIndicator) field, a last grandmaster phase change (lastGMPhaseChange) field, and a scaled last grandmaster frequency change (scaledLastGMFreqChange) field. The fields included in the Follow_Up information TLV field are described as follows:

A value of the TLV type (tlvType) field is 0×3. The value indicates that the TLV is an extended TLV of a vendor and a standard organization. A value of the length field (length- Field) field is 28. The organization identity (organizationID) field is 00-80-C2. A value of the organization subtype (organizationSubType) field is 1. The cumulative scaled rate offset (cumulativeScaledRateOffset) field is a value of a cumulative scaledRateOffset. A value of the grandmaster time base indicator (gmTimeBaseIndicator) field is timeBaseIndicator of a lockSource entity of a current Grandmaster PTP instance (refer to content of the section 9.2.2.3 in the IEEE 802.1AS-2020 protocol). A value of the last grandmaster phase change (lastGMPhaseChange) field is time of a current main control clock minus time of a previous main control clock. The value is copied from a lastGmPhaseChange field in a structure of a Sync packet. A value of the scaled last grandmaster frequency change (scaledLastGMFreqChange) field is a fractional frequency offset of a current grandmaster clock relative to a previous grandmaster clock.

In the IEEE 802.1AS-2020 protocol standard, one device may support a plurality of 1588 entities. All the entities correspond to different clock domains (which are briefly referred to as domains). Each entity may be a BC entity or a GM entity. Each BC entity includes one slave port and at least one master port. Each GM entity includes at least one master port. In addition, a clock packet is independently processed in different domains.

For example, a network device includes an entity 1 and an entity 2, and both the entity 1 and the entity 2 are BC entities. Refer to FIG. 6. A clock domain corresponding to the entity 1 is a domain 1, and a clock domain corresponding to the entity 2 is a domain 2. A slave 1 port receives a clock packet of the domain 1 sent by a clock source device corresponding to the entity 1 of the device. The slave 1 port obtains a clock dataset based on the received clock packet. The clock dataset includes data carried in the clock packet and data generated when the slave 1 port receives the clock packet. The entity 1 transmits, to a master 1 port, the clock dataset obtained by the slave 1 port. The master 1 port updates the clock dataset based on the sent clock packet. The master 1 port sends the clock packet of the domain 1 to a downlink device based on an updated clock dataset. A slave 2 port receives a clock packet of the domain 2 sent by a clock source device corresponding to the entity 2 of the device. The slave 2 port obtains a clock dataset based on the received clock packet. The clock dataset includes data carried in the clock packet and data generated when the slave 2 port receives the clock packet. The entity 2 transmits the clock dataset obtained by the slave 2 port to a master 2 port. The master 2 port updates the clock dataset based on the sent clock packet. The master 2 port sends the clock packet of the domain 2 to the downlink device based on an updated clock dataset.

As an application range of the IEEE 802.1AS-2020 protocol standard in the TSN industrial field and the TSN vehicle-mounted field is increasingly wide, a requirement for high reliability of clock synchronization of the 1588 packet is increasingly high. Based on IEEE 802.1AS-2020, the IEEE standard is researching and formulating a 1588 multi-domain hot backup solution. The multi-domain hot backup solution needs to be implemented by using functions of a clock slave (ClockSlave) module and a clock master (ClockMaster) module. The ClockSlave module is configured to recover, based on information about the slave port, time of the clock source corresponding to the entity 1, and the ClockMaster module is configured to synchronize time of the ClockSlave module.

Figure 7:
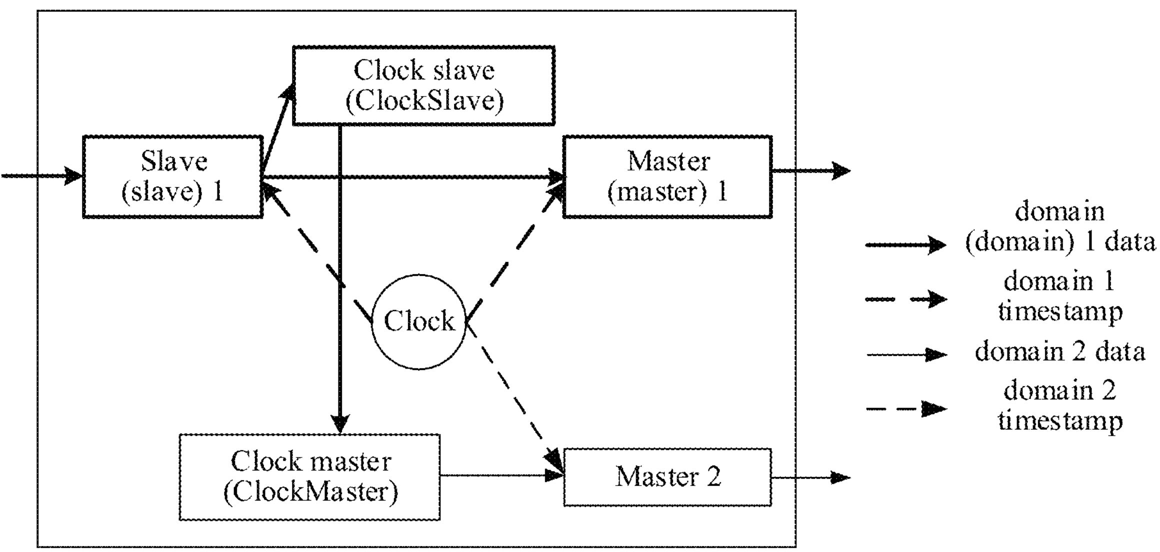
FIG. 7 is a schematic diagram of a structure of a network device according to an embodiment of this application.

Refer to FIG. 7. When a slave 2 port of a domain 2 corresponding to an entity 2 is invalid or does not exist, a ClockSlave module of the entity 1 recovers, based on information about a slave 1 port, time of a time source corresponding to the entity 1. A device transmits the time of the time source recovered by the ClockSlave module of the entity 1 to a ClockMaster module of an entity 2. The ClockMaster module of the entity 2 may obtain information from the ClockSlave module of the entity 1, so that the time of the ClockMaster module of the entity 2 is synchronized with the time of the ClockSlave module of the entity 1, and further, the master 2 port can continue to send a 1588 packet of the entity 2 based on the time of the ClockMaster module. Therefore, a timestamp carried in the 1588 packet of the entity 2 is synchronized with the time recovered by the ClockSlave module of the entity 1, and the 1588 packet sent by the port of master 2 may carry precise time.

However, in the foregoing method shown in FIG. 7, the ClockSlave module needs to recover the time of the time source based on the slave 1 port and synchronize the time to the ClockMaster module, so that the master 2 port can send a clock packet based on the time that is of the time source recovered by the ClockSlave module and that is synchronized by the ClockMaster module. In other words, a timestamp carried in the clock packet sent by the master 2 port is the time obtained by the ClockSlave module through recovery based on the slave 1 port, instead of a timestamp carried in a clock packet received by the slave 1 port. For example, the timestamp carried in the clock packet received by the slave 1 port is 0:0:0 on Jan. 1, 2021. Because a transmission latency of one second exists between the ClockSlave module and the slave 1 port, the time that is of the time source and that is obtained by the ClockSlave module through recovery based on the slave 1 port is 0:0:1 on Jan. 1, 2021. The ClockMaster module synchronizes the foregoing time 0:0:1 on Jan. 1, 2021, and sends the time to the master 2 port. Therefore, the timestamp carried in the clock packet sent by the master 2 port is 0:0:1 on Jan. 1, 2021, instead of 0:0:0 on Jan. 1, 2021.

In addition, based on a requirement of the IEEE 802.1AS-2020 standard, the ClockMaster module is included in some embodiments, and some embodiments include devices that do not have the ClockMaster module. As a result, the foregoing multi-domain hot backup method cannot be used for these devices. In addition, ClockSlave time synchronized by a slave port needs to be used as ClockMaster time sent by a master port of another domain, and the ClockSlave module needs the device to support a time recovery function. In other words, the ClockSlave module and the ClockMaster module need to be implemented by using an additional hardware device, for example, a hardware module that supports a clock phase-locked loop function, and an implementation process is complex.

Figure 8:
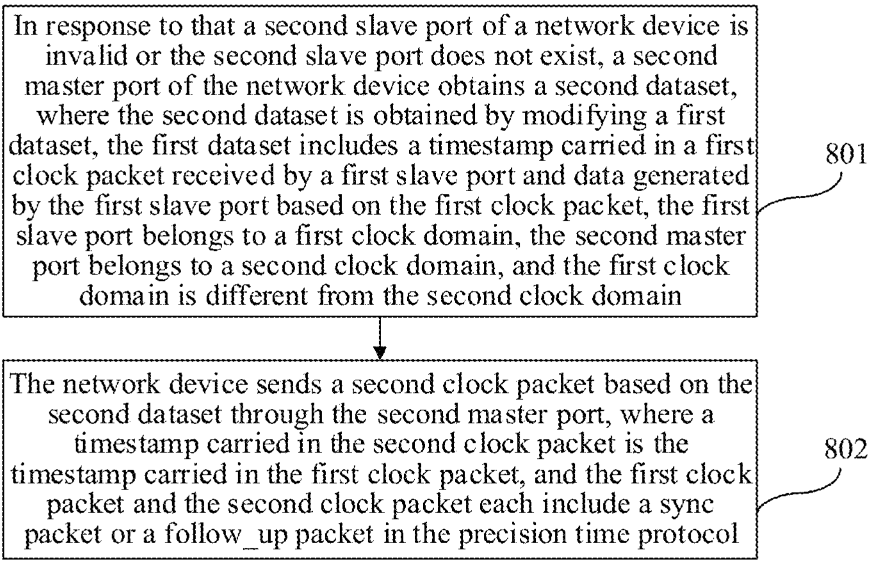
FIG. 8 is a flowchart of a packet transmission method according to an embodiment of this application.

In this case, an embodiment of this application provides a packet transmission method, to implement a multi-domain hot backup function of a network device in a simple manner. The method may be applied to a communication system including a plurality of network devices. The plurality of network devices include at least a GM device and a BC device. Each network device in the plurality of network devices can support simultaneous transmission of clock packets of a plurality of clock domains. For example, in this embodiment of this application, any one of the plurality of network devices is used as an example to describe the packet transmission method provided in this embodiment of this application. Refer to FIG. 8. The method includes the following Operation 801 and Operation 802.

Operation 801: In response to that a second slave port of a network device is invalid or the second slave port does not exist, a second master port of the network device obtains a second dataset. The second dataset is obtained by modifying a first dataset. The first dataset includes a timestamp carried in a first clock packet received by a first slave port and data generated by the first slave port based on the first clock packet. The first slave port belongs to a first clock domain, the second master port belongs to a second clock domain, and the first clock domain is different from the second clock domain.

In an embodiment, the network device supports a plurality of entities, and each entity may be implemented as a BC or a GM. Each BC entity includes one slave port and at least one master port, and each GM entity includes at least one master port. In addition, BC entities or GM entities independently process a clock packet.

The second slave port of the network device may be a slave port corresponding to a BC entity included in the network device. That the second slave port is invalid or does not exist means that a second slave port of a BC entity of the network device is invalid or lost, or that a GM entity of the network device does not have a slave port. The second master port of the network device may be a master port corresponding to a BC entity included in the network device, or a master port corresponding to a GM entity of the network device. The second master port belongs to the second clock domain. The first slave port of the network device may be a slave port of another BC entity of the network device, and the first slave port exists and is valid. In other words, currently, the first slave port can normally process a clock packet. The first slave port belongs to the first clock domain. The first clock domain and the second clock domain herein are two different clock domains.

For example, an example in which the network device includes two BC entities is used for description. A first slave port and a first master port of a first BC entity belong to the first clock domain, and a second slave port and a second master port of a second BC entity belong to the second clock domain. For example, in the IEEE 802.1AS-2020 protocol standard, each clock domain supported by the network device is referred to as an entity, that is, the first clock domain is referred to as an entity 1, and the second clock domain is referred to as an entity 2. In this embodiment of this application, the entity 1 and the entity 2 support a BC function, and are also referred to as a BC entity 1 and a BC entity 2. A first slave port corresponding to the BC entity 1 is referred to as a slave 1 port, a first master port corresponding to the BC entity 1 is referred to as a master 1 port, a second slave port corresponding to the BC entity 2 is referred to as a slave 2 port, and a second master port corresponding to the BC entity 2 is referred to as a master 2 port.

In an embodiment, the second master port of the BC entity 2 and the first slave port of the BC entity 1 may alternatively form a converged BC entity. The converged BC entity is different from the BC entity defined in the IEEE 802.1AS-2020 standard. The standard BC entity is limited to processing clock data and another function in a same entity. The clock data includes but is not limited to timestamp information. The converged BC entity allows processing of the clock data and the another function between different converged clock domains. For example, the converged BC entity formed by the second master port of the BC entity 2 and the first slave port of the BC entity 1 allows the second master port to receive clock data from the first slave port.

In an embodiment, the first dataset includes the timestamp and related data that are carried in the first clock packet received by the first slave port of the network device, and the data generated by the first slave port based on the received first clock packet. In this embodiment of this application, the first clock packet includes a sync packet in the precision time protocol. In an embodiment, in a two-step mode, the first clock packet further includes a follow up packet. The precision time protocol includes the PTP protocol defined in IEEE 1588 or the gPTP defined in IEEE 802.1AS.

A manner of obtaining the first dataset is not limited in this embodiment of this application. In an embodiment, before the second master port of the network device obtains the second dataset, the method further includes: The first slave port of the network device receives the first clock packet sent by a third master port, where the third master port is a master port corresponding to the first clock domain of a clock source device of the network device; obtains, based on the received first clock packet, the data generated based on the first clock packet; and generates the first dataset based on the timestamp carried in the first clock packet and the data generated based on the first clock packet.

In this embodiment of this application, the first slave port of the network device can receive the first clock packet sent by the master port corresponding to the first clock domain. The first clock packet carries the timestamp of the clock source device. The first slave port can generate corresponding data based on the received first clock packet, for example, a receiving timestamp of the first clock packet or information about a latency between the first slave port and the third master port. In this way, the first slave port can generate, based on the timestamp of the clock source device carried in the first clock packet and the data generated based on the first clock packet, the first dataset that carries clock data of the first clock domain.

In an embodiment, an example in which the first clock packet is a sync packet is used. The first dataset generated based on the sync packet is referred to as a port synchronization (portSyncSync) dataset in the IEEE 802.1AS-2020 protocol standard, and members of the first dataset include: domainNumber, a local port number (localPortNumber), synchronization receipt time (syncReceiptTimeoutTime), a follow-up correction field (followUpCorrectionField), sourcePortIdentity, logMessageInterval, preciseOriginTimestamp, uplink sending time (upstreamTxTime), a frequency offset (rateRatio), gmTimeBaseIndicator, lastGmPhaseChange, and lastGmFreqChange.

For a one-step mode, the first slave port receives only the sync packet. Based on the structure of the PTP packet header shown in FIG. 1, the structure of the sync packet shown in FIG. 2, and the structure of the Follow_Up information TLV field shown in FIG. 5, it can be learned that a timestamp carried in the sync packet received by the first slave port of the network device is originTimestamp, and data carried in the sync packet received by the first slave port of the network device includes: domainNumber, sourcePortIdentity, logMessageInterval, correctionField, cumulativeScaledRateOffset, gmTimeBaseIndicator, lastGmPhaseChange, and scaledLastGmFreqChange. DomainNumber, followUpCorrectionField, sourcePortIdentity, logMessageInterval, preciseOriginTimestamp, gmTimeBaseIndicator, lastGmPhaseChange, and lastGmFreqChange in the portSyncSync dataset generated by the first slave port respectively come from domainNumber, correctionField, sourcePortIdentity, logMessageInterval, originTimestamp, gmTimeBaseIndicator, lastGmPhaseChange, and scaledLastGmFreqChange of the sync packet.

LocalPortNumber in the portSyncSync dataset generated by the first slave port is a PTP port number of the first slave port. The rateRatio in the portSyncSync dataset generated by the first slave port is the cumulativeScaledRateOffset in the sync packet plus neighbor rate ratio (neighborRateRatio) generated by the first slave port. The neighborRateRatio is calculated based on timestamps carried in a point delay request (pdelay_req) packet, a point delay response (pdelay_resp) packet, and a point delay response follow-up (pdelay_resp follow up) packet exchanged between the first slave port and an upstream port. The neighborRateRatio represents a frequency offset of the network device relative to an uplink device, the cumulativeScaledRateOffset represents a frequency offset of the uplink device of the network device relative to a GM clock device, and the rateRatio represents a frequency offset of the network device relative to the GM clock device.

The upstreamTxTime in the portSyncSync dataset generated by the first slave port needs to be generated and obtained by the first slave port based on the received sync packet. In an embodiment, an example in which the first clock packet is a sync packet is used. A process in which the first slave port obtains data generated based on the sync packet is described as follows: First, the first slave port obtains an ingress timestamp corresponding to a local clock when the network device receives the sync packet, and the ingress timestamp is marked as Ta; upstreamTxTime=Ta−meanPathDelay/neighborRateRatio. An average path delay (meanPathDelay) is an optical fiber latency between the first slave port and the third master port of an uplink device, and the meanPathDelay is calculated by using timestamp information carried in a point delay request (pdelay_req) packet, a point delay response (pdelay_resp) packet, and a point delay response follow-up (pdelay_resp follow up) packet.

For a two-step mode, the first slave port receives the sync packet and a follow up packet. Based on the structure of the follow_up packet shown in FIG. 4 and the structure of the Follow_Up information TLV field shown in FIG. 5, it can be learned that data carried in the follow_up packet received by the first slave port of the network device includes: domainNumber, sourcePortIdentity, logMessageInterval, followUpCorrectionField, preciseOriginTimestamp, cumulativeScaledRateOffset, gmTimeBaseIndicator, lastGmPhaseChange, and scaledLastGmFreqChange. DomainNumber, followUpCorrectionField, sourcePortIdentity, logMessageInterval, preciseOriginTimestamp, gmTimeBaseIndicator, lastGmPhaseChange, and lastGmFreqChange in the portSyncSync dataset generated by the first slave port respectively come from domainNumber, followUpCorrectionField, sourcePortIdentity, logMessageInterval, preciseOriginTimestamp, gmTimeBaseIndicator, lastGmPhaseChange, and scaledLastGmFreqChange of the follow_up packet. For localPortNumber, rateRatio, and upstreamTxTime in the portSyncSync dataset generated by the first slave port, refer to the one-step generation mode.

In an embodiment, because the first dataset is obtained by the first slave port based on the clock packet of the first clock domain, information included in the first dataset is information about the first clock domain, and the first dataset needs to be modified based on information about the second clock domain, to obtain the second dataset including the information about the second clock domain, so that the second master port can send a clock packet of the second clock domain based on the second dataset.

In an embodiment, that a second master port of the network device obtains a second dataset includes: The second master port receives the first dataset, and modifies the first dataset based on information about the second clock domain, to obtain the second dataset. In this implementation, a second entity corresponding to the second clock domain or a second master port of the second entity corresponding to the second clock domain has a function of modifying the first dataset.

In an embodiment, that a second master port of the network device obtains a second dataset includes: A second entity receives the first dataset. The second entity modifies the first dataset based on information about the second clock domain, to obtain the second dataset. The second master port receives the second dataset sent by the second entity. In this implementation, the second entity has a function of modifying the first dataset, and the second master port directly receives the second dataset obtained after the second entity modifies the first dataset.

In this embodiment of this application, the network device may further include an interworking function (IWF) module. The IWF module has a function of converting a state or a protocol into a consistent network or user service, and can hide apparatuses that are different in physical links and network technologies. In other words, the IWF module is a network function entity that can provide interconnection. The IWF module may be a part of one or more logical or physical entities in a network. The entity refers to any element, component, functional unit, device, subsystem, or system that can be viewed independently. The IWF module may be implemented by using only software code.

In an embodiment, an IWF module is included between the second master port and the first slave port. That a second master port of the network device obtains a second dataset includes: The second master port receives the second dataset sent by the IWF module. The IWF module is configured to modify the first dataset based on information about the second clock domain, to obtain the second dataset.

In an embodiment, the IWF module may be a part of the second master port, may be a part of the first slave port, or may be a part of the network device. When the IWF module is a part of the network device, the IWF module may be further configured to: when the first slave port is invalid or lost, modify, based on parameter information of the first clock domain, a dataset generated by the second slave port. The dataset includes data carried in a clock packet received by the second slave port and data generated by the second slave port based on the clock packet.

Figure 9:
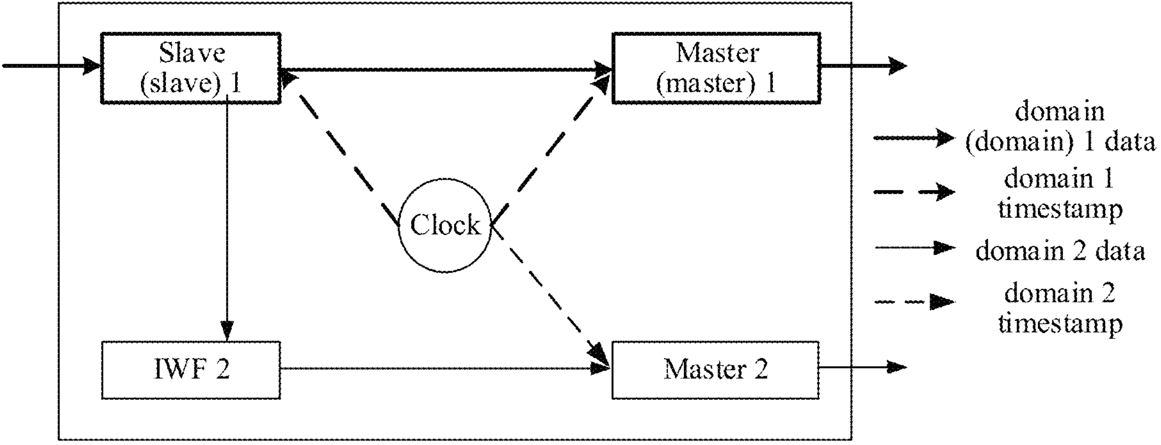
FIG. 9 is a schematic diagram of a structure of a network device according to an embodiment of this application.

For example, refer to a schematic diagram of a structure of a network device shown in FIG. 9. An IWF module is represented by an IWF 2 module. In this case, in a domain 2, a slave 2 port does not exist or the slave 2 port is lost. The slave 1 port sends a clock dataset of a domain 1, namely, a first dataset, to the IWF 2 module, and the IWF 2 module correspondingly modifies the clock dataset of the domain 1 to a clock dataset of the domain 2, namely, a second dataset. Then, the IWF 2 module sends the second dataset of the domain 2 to a master 2 port, so that the master 2 port can continue to generate and send a clock packet of the domain 2 based on the second dataset of the domain 1. In this way, when the slave 2 port does not exist or is invalid, the master 2 port can still maintain transmission of the clock packet of the domain 2, and the clock packet sent by the master 2 port also carries precise time.

In an embodiment, the modifying the first dataset based on information about the second clock domain includes the following two manners: Manner 1: Only a value of domainNumber is modified to a domain name of the second clock domain of the network device, and a value of another parameter in the first dataset does not need to be modified. Manner 2: A value of domainNumber is modified to a domain name of the second clock domain of the network device, a value of localPortNumber is modified to a first value, a value of syncReceiptTimeoutTime is modified to a second value, a clock identity clockIdentity in sourcePortIdentity is modified to clockIdentity of the second clock domain of the network device, a port number portnumber in sourcePortIdentity is modified to a third value, logMessageInterval is modified to a time interval at which ClockMaster of the second clock domain sends a packet, and values of gmTimeBaseIndicator, lastGmPhaseChange, and lastGmFreqChange do not need to be modified. The first value, the second value, and the third value may all be flexibly set based on a requirement.

For example, an example in which the first clock packet is a sync packet is used. The modifying the first dataset based on information about the second clock domain includes the following two cases.

Case 1: When the slave 2 port is invalid or does not exist, the network device serves as a BC entity of the second clock domain.

In Case 1, the modifying the first dataset based on information about the second clock domain includes: The value of domainNumber is modified to the domain name of the second clock domain of the network device. For example, the domain name of the second clock domain of the network device is an identity domain 2. The value of the another parameter in the first dataset does not need to be modified.

Case 2: When the slave 2 port is invalid or does not exist, the network device serves as a GM entity of the second clock domain.

In Case 2, the network device serves as a GM clock node of the second clock domain. The GM clock node periodically sends a clock packet. Time of another BC node of the second clock domain is consistent with time of the GM clock node. In an embodiment, the modifying the first dataset based on information about the second clock domain (refer to content in section 10.2.9 of the IEEE 802.1AS-2020 protocol) includes:

1. modifying the value of domainNumber to an identity domain 2 of the second clock domain of the network device;
2. modifying the value of localPortNumber to 0;
3. modifying the value of syncReceiptTimeoutTime to $FFFFFFFFFFFFFFFF_{16}$;
4. modifying the clock identity clockIdentity in sourcePortIdentity to the clockIdentity of the second clock domain of the network device, and modify the port number portnumber in sourcePortIdentity to 0;
5. modifying logMessageInterval to the time interval at which the ClockMaster of the second clock domain sends the packet; and
6. skipping modifying the values of the gmTimeBaseIndicator, lastGmPhaseChange, and lastGmFreqChange.

In this way, in the foregoing manner, information that belongs to the domain 1 and that is in the first dataset can be modified to information about the domain 2, and the second dataset including the information about the domain 2 and the synchronization clock information is generated. In this embodiment of this application, member parameters of the first dataset and the second dataset are not limited. In other words, the first dataset and the second dataset may have a same or different quantity of members, provided that the second dataset is obtained by modifying the first dataset.

Operation 802: The network device sends a second clock packet based on the second dataset through the second master port. A timestamp carried in the second clock packet is the timestamp carried in the first clock packet. The first clock packet and the second clock packet each include a synchronization sync packet or a follow-up follow up packet in the precision time protocol.

In this embodiment of this application, the second clock packet includes the sync packet in the precision time protocol. In an embodiment, in the two-step mode, the second clock packet further includes the follow up packet, and the second clock packet and the first clock packet has a same type. The second dataset is obtained by modifying the first dataset, but timestamp information is not modified in a modification process. The timestamp included in the second dataset is a timestamp in the first dataset, in other words, a timestamp carried in the first clock packet. Therefore, a timestamp carried in the second clock packet is the timestamp carried in the first clock packet. The timestamp is originTimestamp in the sync packet or the preciseOriginTimestamp in the follow up packet.

For example, the timestamp carried in the first clock packet received by the slave 1 port is 0:0:0 on Jan. 1, 2021. Because the timestamp carried in the second clock packet is the timestamp carried in the first clock packet, the timestamp carried in the second clock packet sent by the master 2 port is 0:0:0 on Jan. 1, 2021. A latency inside the network device may be carried in the clock packet by using other information, for example, may be carried in a correctionField field in a header field of the sync packet or the follow up packet. In this way, based on the timestamp carried in the clock packet and the latency, time carried in the second packet can still be synchronized with time of a time source.

For a manner of using a ClockSlave module and a ClockMaster module, a transmission latency of 1 second exists between the ClockSlave module and the slave 1 port, time that is of the time source and that is obtained by the ClockSlave module through recovery based on the slave 1 port is 0:0:1 on Jan. 1, 2021, and the ClockMaster module synchronizes the foregoing time 0:0:1 on Jan. 1, 2021, and sends the time to the master 2 port. Therefore, the timestamp carried in the clock packet sent by the master 2 port is 0:0:1 on Jan. 1, 2021, instead of 0:0:0 on Jan. 1, 2021.

It can be learned that the method provided in this embodiment of this application is different from a manner of using the ClockSlave module and the ClockMaster module.

In an embodiment, the network device can generate the second clock packet based on the second dataset, and send the second clock packet by using the second master port. A manner in which the network device generates the second clock packet based on the second dataset is not limited in this application. Data carried in the second clock packet may include all data in the second dataset, or may include only a part of the data in the second dataset, provided that the second clock packet sent by using the second master port can be ensured to be normally sent.

In an embodiment, an example in which the first clock packet and the second clock packet are sync packets is used. In the one-step mode, a process in which the network device sends the second clock packet based on the second dataset through the second master port master 2 is: obtaining an egress timestamp corresponding to a local clock of the network device when the second clock packet is sent; updating a value of followUpCorrectionField based on the egress timestamp; writing preciseOriginTimestamp, rateRatio, and updated followUpCorrectionField in the second dataset into an originTimestamp field, a cumulativeScaledRateOffset field, and a correctionField field of the second clock packet; and sending the second clock packet to a downlink device by using the second master port. OriginTimestamp carried in the second clock packet is originTimestamp carried in the first clock packet.

In an embodiment, an example in which the first clock packet and the second clock packet are sync packets is used. In the two-step mode, a process in which the network device sends the second clock packet based on the second dataset through the second master port master 2 is: obtaining an egress timestamp corresponding to a local clock of the network device when the second clock packet is sent; updating a value of followUpCorrectionField based on the egress timestamp; writing preciseOriginTimestamp, rateRatio, and updated followUpCorrectionField in the second dataset into a preciseOriginTimestamp field, a cumulativeScaledRateOffset field, and a correctionField field of a slave packet corresponding to a master packet; and sending the master packet and the domain 1 packet to a downlink device through the second master port. For example, the master packet is the sync packet in the two-step mode, and the slave packet is the follow up packet in the two-step mode.

In an embodiment, the process of updating the value of the followUpCorrectionField based on the egress timestamp includes but is not limited to: followUpCorrectionField=followUpCorrectionField+(Tb−upstreamTxTime)*rateRatio. The Tb is the egress timestamp corresponding to the local clock when the network device sends the second clock packet, and the followUpCorrectionField on the right of the equation is a member in the second dataset received by the second master port.

In this embodiment of this application, the second clock packet sent by the second master port of the network device carries information such as originTimestamp, the preciseOriginTimestamp, the followUpCorrectionField, and the rateRatio. OriginTimestamp carried in the second clock packet is originTimestamp carried in the first clock packet. Alternatively, the preciseOriginTimestamp carried in the second clock packet is the preciseOriginTimestamp carried in the first clock packet. In this way, when the second slave port of the network device is invalid or the second slave port does not exist, the second master port can maintain an objective of sending a clock packet that carries precise time information, so that the precise time of the clock packet of the entity 2 is transmitted continuously, and high reliability of clock synchronization of a communication system is improved.

In an embodiment, the network device may further include a second switch. That in response to that a second slave port of a network device is invalid or the second slave port does not exist, a second master port of the network device obtains a second dataset includes: In response to that the second slave port is invalid or the second slave port does not exist, the second master port of the network device obtains the second dataset based on control of the second switch and the first dataset corresponding to the first slave port. In this way, the second slave port belongs to the second clock domain, and the packet transmission method further includes: In response to that the second slave port exists and is valid, the second master port of the network device sends a third clock packet based on the control of the second switch and a third dataset corresponding to the second slave port, where the third clock packet includes a sync packet or a follow up packet in the precision time protocol. Content of the third dataset corresponding to the second slave port is not limited in this embodiment of this application. For details, refer to the content of the first dataset. For example, the third dataset includes a timestamp carried in the clock packet received by the second slave port and the data generated by the second slave port based on the received clock packet.

Figure 10:
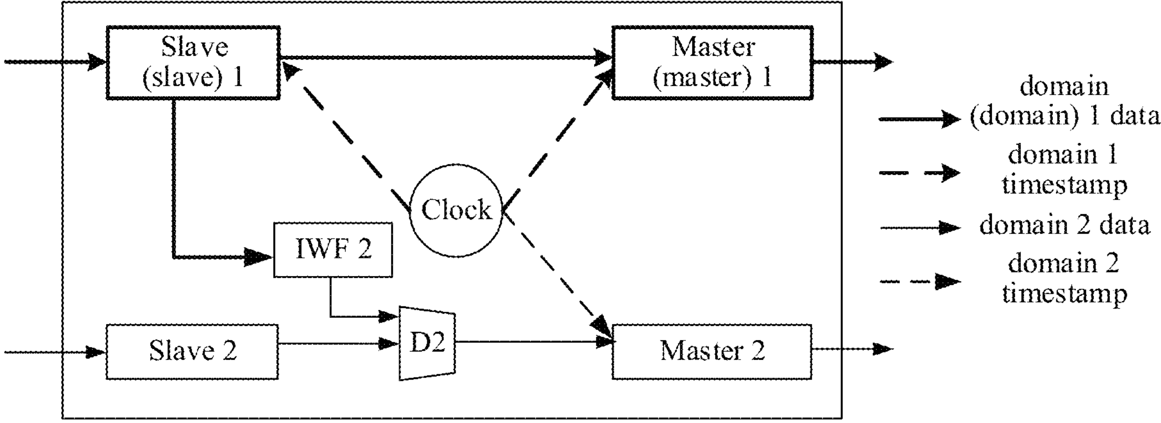
FIG. 10 is a schematic diagram of a structure of a network device according to an embodiment of this application.

For example, an example in which an IWF module modifies a first dataset is used. Refer to FIG. 10. A second switch is represented by a symbol D2, and an IWF module is represented by an IWF 2. In a schematic diagram of a structure of a network device shown in FIG. 10, a slave 2 port of a domain 2 exists, and an output of the slave 2 port and the IWF 2 module is connected to the switch D2. When the slave 2 port is valid, the switch D2 controls a master 2 port to receive a clock dataset sent by the slave 2 port, that is, the third dataset in embodiments of this application. When the slave 2 port is invalid or lost, the switch D2 controls the master 2 port to receive the clock dataset sent by the IWF 2 module, that is, the second dataset in embodiments of this application. Herein, the IWF 2 module can generate the second dataset by modifying a received clock dataset (that is, the first dataset in embodiments of this application) of a slave 1 port. In this way, it can be ensured that the network device can control the switch D2 based on a state of the slave 2 port, so that the master 2 port can continue to maintain transmission of the precise time of the clock packet of the domain 2 when the slave 2 port is invalid or lost.

In an embodiment, the network device may further include a first switch. In this case, a first master port belongs to the first clock domain, and the second slave port belongs to the second clock domain. The packet transmission method further includes: In response to that the first slave port exists and is valid, the first master port of the network device sends a fourth clock packet based on control of the first switch and the first dataset corresponding to the first slave port. The fourth clock packet includes a sync packet or a follow up packet in the precision time protocol. In response to that the first slave port is invalid or the first slave port does not exist, and the second slave port exists and is valid, the first master port of the network device sends a fifth clock packet based on the control of the first switch and the third dataset corresponding to the second slave port. The fifth clock packet includes a sync packet or a follow up packet in the precision time protocol.

Content of the third dataset corresponding to the second slave port is not limited in this embodiment of this application. For details, refer to the content of the first dataset. For example, the third dataset includes a timestamp carried in the clock packet received by the second slave port and the data generated by the second slave port based on the received clock packet. Details of a manner in which the first master port of the network device sends a fifth clock packet based on the control of the first switch and the third dataset corresponding to the second slave port are not described herein again.

Figure 11:
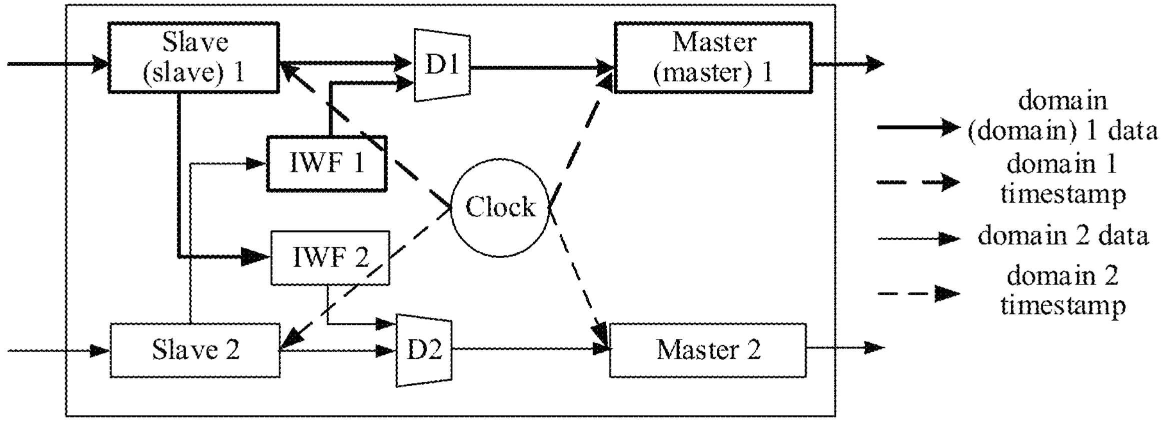
FIG. 11 is a schematic diagram of a structure of a network device according to an embodiment of this application.

For example, an example in which an IWF module modifies a first dataset is used. Refer to FIG. 11. A first switch is represented by a symbol D1, and a second switch is represented by a symbol D2. An IWF module includes an IWF 1 part and an IWF 2 part. The IWF 1 is configured to modify a dataset from a second slave port, and the IWF 2 is configured to modify a dataset from a first slave port. In a schematic diagram of a structure of a network device shown in FIG. 11, neither the slave 1 port of a domain 1 nor the slave 2 port of a domain 2 is lost, an output of the slave 1 port and the IWF 1 module is connected to the switch D1, and an output of the slave 2 port and the IWF 2 module is connected to the switch D2.

When the slave 1 port exists and is valid, the switch D1 is used to control a master 1 port to receive the clock dataset sent by the slave 1 port. When the slave 1 port is invalid or lost, the switch D1 controls the master 1 port to receive a clock dataset sent by the IWF 1 module. In this way, it can be ensured that the network device can control the switch D1 based on a state of the slave 1 port, so that the master 1 port can continue to maintain transmission of a clock packet when the slave 1 port is invalid or lost. Similarly, when the slave 2 port exists and is valid, the switch D2 is used to control a master 2 port to receive the clock dataset sent by the slave 2 port. When the slave 2 port is invalid or the second slave port is invalid or lost, the switch D2 controls the master 2 port to receive a clock dataset sent by the IWF 2 module. In this way, it can be ensured that the network device can control the switch D2 based on a state of the slave 2 port, so that the master 2 port can continue to maintain the transmission of the clock packet when the slave 2 port is invalid or lost.

In an embodiment, the IWF 1 module and the IWF 2 module in the schematic diagram of the structure of the network device shown in FIG. 11 may alternatively be a same IWF module. In this case, when the slave 1 port is invalid or does not exist, the IWF module modifies the clock dataset of the slave 2 port and sends the clock dataset to the master 1 port. When the slave 2 port is invalid or does not exist, the IWF module modifies the clock dataset of the slave 1 port and sends the clock dataset to the master 2 port.

According to the packet transmission method provided in this embodiment of this application, when the second slave port of the network device is invalid or the second slave port does not exist, the second master port can obtain the second dataset that is obtained by modification based on the first dataset, and then continue to send, based on the second dataset, the clock packet that carries the precise time. In other words, in the method provided in this embodiment of this application, the ClockMaster module and the ClockSlave module may not be used, so that when a slave port of a clock domain in a multi-domain clock device is invalid or does not exist, a master port of the clock domain can still maintain sending a clock packet with precise time. In this method, a multi-domain hot backup function of the multi-domain clock device is implemented in a simple manner, thereby improving reliability of a communication system. BC devices that do not support the ClockMaster module and the ClockSlave module can also implement the multi-domain hot backup hot-Standby function.

In addition, according to the method provided in this embodiment of this application, a protection switch is used. When a slave port of a domain is normal, data and a packet of the slave port of the domain are sent to a master port of the domain. When a slave port of a domain does not exist or is invalid, data and a packet of a slave port of another domain are sent to a master port of the domain by using IWF conversion, to improve reliability and flexibility of packet transmission.

Figure 12:
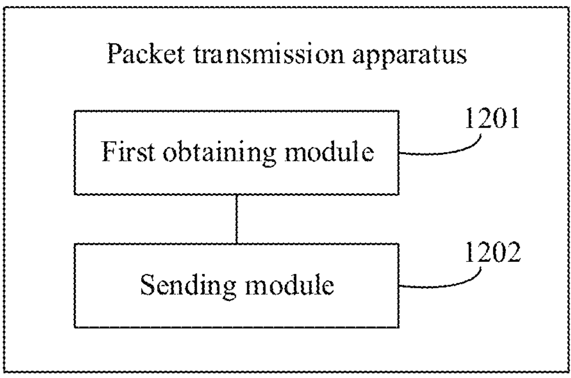
FIG. 12 is a schematic diagram of a structure of a packet transmission apparatus according to an embodiment of this application.

The foregoing describes the packet transmission method in embodiments of this application. Corresponding to the foregoing method, embodiments of this application further provides a packet transmission apparatus. FIGS. 12 to 15 are schematic diagrams of structures of packet transmission apparatuses according to embodiments of this application. The apparatuses are used in a network device, and the network device is the network device shown in FIG. 6 and FIG. 7, FIG. 9 to FIG. 11, or FIG. 16 and FIG. 17. Based on the following a plurality of modules of the packet transmission apparatuses shown in FIGS. 12 to 15, the packet transmission apparatuses shown in FIGS. 12 to 15 can perform all or a part of operations performed by the network device. It should be understood that the apparatuses may include more additional modules than the shown modules or omit a part of the shown modules. This is not limited in embodiments of this application. As shown in FIG. 12, a packet transmission apparatus includes:

- a first obtaining module 1201, configured to: in response to that a second slave port of a network device is invalid or the second slave port does not exist, obtain, by a second master port of the network device, a second dataset, where the second dataset is obtained by modifying a first dataset, the first dataset includes a timestamp carried in a first clock packet received by a first slave port and data generated by the first slave port based on the first clock packet, the first slave port belongs to a first clock domain, the second master port belongs to a second clock domain, and the first clock domain is different from the second clock domain; and
- a sending module 1202, configured to send a second clock packet based on the second dataset through the second master port, where a timestamp carried in the second clock packet is a timestamp carried in the first clock packet, and the first clock packet and the second clock packet each include a synchronization sync packet or a follow-up follow_up packet in the precision time protocol.

The timestamp is originTimestamp in the sync packet or preciseOriginTimestamp in the follow_up packet.

In an embodiment, the first obtaining module 1201 is configured to receive, by the second master port, the first dataset, and modify the first dataset based on information about the second clock domain, to obtain the second dataset.

In an embodiment, an IWF module is included between the second master port and the first slave port. The IWF module is configured to modify the first dataset based on the information about the second clock domain, to obtain the second dataset. The first obtaining module 1201 is configured to receive, by the second master port, the second dataset sent by the IWF module.

In an embodiment, the first dataset includes a domain name domainNumber. The first obtaining module 1201 is further configured to modify a value of domainNumber to a domain name of the second clock domain of the network device.

In an embodiment, the first dataset includes a domain name domainNumber, a local port number localPortNumber, synchronization receipt time syncReceiptTimeoutTime, a source port identity sourcePortIdentity, and a log message interval logMessageInterval. The first obtaining module 1201 is further configured to modify a value of domainNumber to a domain name of the second clock domain of the network device, modify a value of localPortNumber to a first value, modify a value of syncReceiptTimeoutTime to a second value, modify a clock identity clockIdentity in sourcePortIdentity to clockIdentity of the second clock domain, modify a port number portnumber in sourcePortIdentity to a third value, and modify logMessageInterval to a time interval at which ClockMaster of the second clock domain sends a packet.

Figure 13:
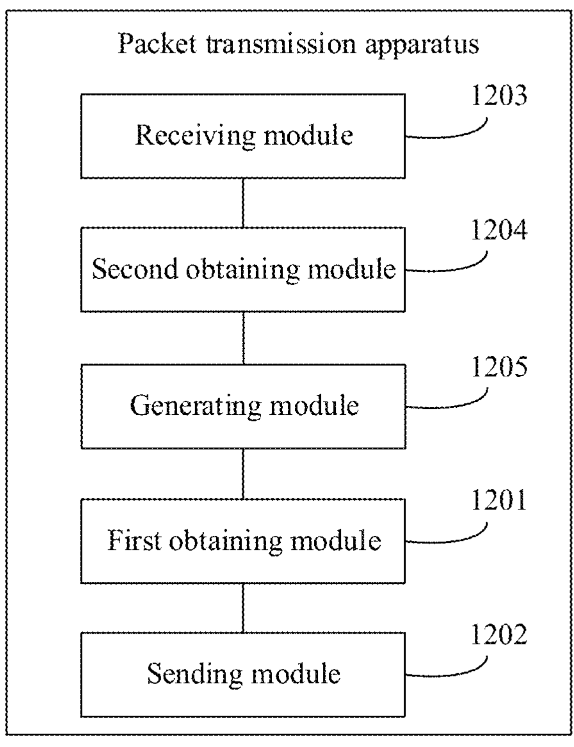
FIG. 13 is a schematic diagram of a structure of a packet transmission apparatus according to an embodiment of this application.

Refer to FIG. 13. In an embodiment, the apparatus further includes:

- a receiving module 1203, configured to receive, by the first slave port of the network device, the first clock packet sent by a third master port, where the third master port is a master port corresponding to the first clock domain of a clock source device of the network device;
- a second obtaining module 1204, configured to obtain, based on the received first clock packet, the data generated based on the first clock packet; and a generating module 1205, configured to generate the first dataset based on the timestamp carried in the first clock packet and the data generated based on the first clock packet.

In an embodiment, the network device includes a second switch. The first obtaining module 1201 is further configured to: in response to that the second slave port is invalid or the second slave port does not exist, obtain, by the second master port of the network device, the second dataset based on control of the second switch and the first dataset corresponding to the first slave port.

Figure 14:
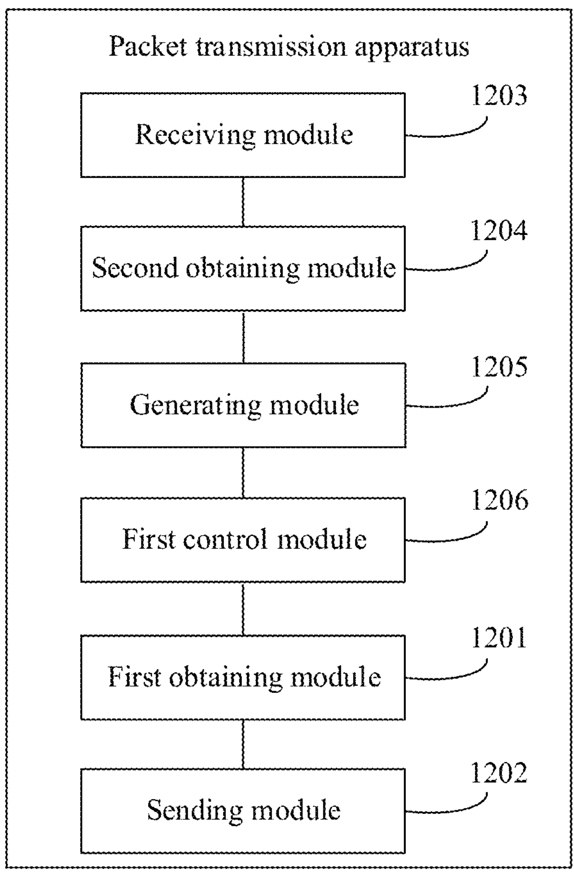
FIG. 14 is a schematic diagram of a structure of a packet transmission apparatus according to an embodiment of this application.

Refer to FIG. 14. In an embodiment, the network device includes a second switch. The apparatus further includes:

a first control module 1206, configured to: in response to that the second slave port exists and is valid, and the second slave port belongs to the second clock domain, send, by the second master port of the network device, a third clock packet based on the control of the second switch and a third dataset corresponding to the second slave port, where the third clock packet includes a sync packet or a follow up packet in the precision time protocol.

Figure 15:
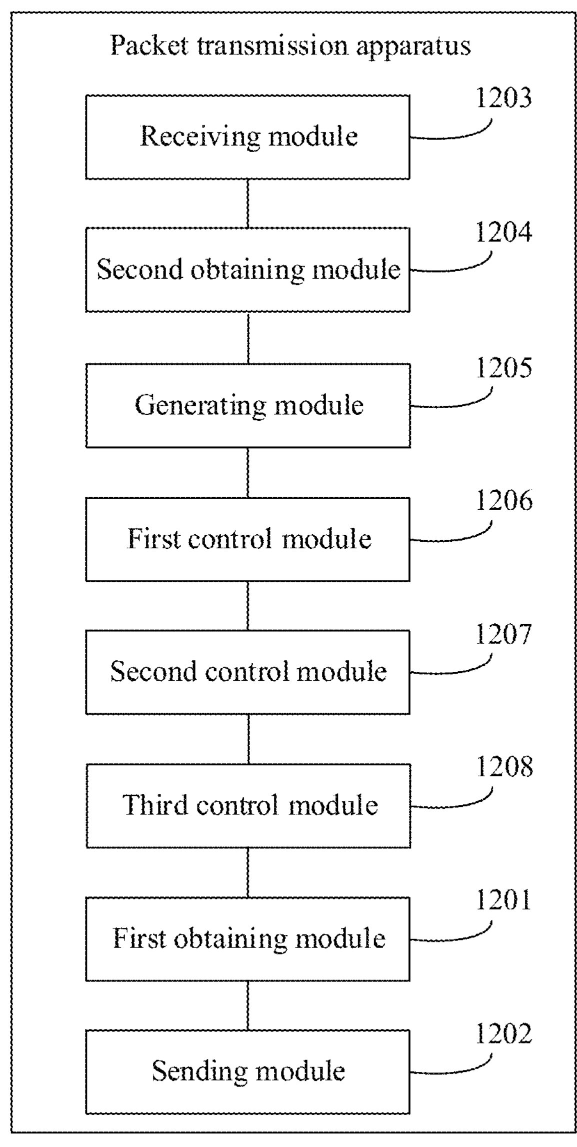
FIG. 15 is a schematic diagram of a structure of a packet transmission apparatus according to an embodiment of this application.

In an embodiment, the network device further includes a first switch. A first master port belongs to the first clock domain. Refer to FIG. 15. The apparatus further includes:

a second control module 1207, configured to: in response to that the first slave port exists and is valid, send, by the first master port of the network device, a fourth clock packet based on control of the first switch and the first dataset corresponding to the first slave port, where the fourth clock packet includes a sync packet or a follow up packet in the precision time protocol; and a third control module 1208, configured to: in response to that the first slave port is invalid or the first slave port does not exist, and the second slave port exists and is valid, send, by the first master port of the network device, a fifth clock packet based on the control of the first switch and the third dataset corresponding to the second slave port. The fifth clock packet includes a sync packet or a follow up packet in the precision time protocol.

It should be understood that, when the apparatuses provided in FIG. 12 to FIG. 15 implement functions thereof, division into the foregoing functional modules is merely used as an example for description. During actual application, the foregoing functions may be allocated to different functional modules for implementation based on a requirement. In other words, a device is divided into different functional modules in terms of an inner structure, to implement all or a part of the functions described above. In addition, the apparatuses provided in the foregoing embodiments and the method embodiments pertain to the same concept. For an implementation process of the apparatus, refer to the method embodiments. Details are not described herein again.

Figure 16:
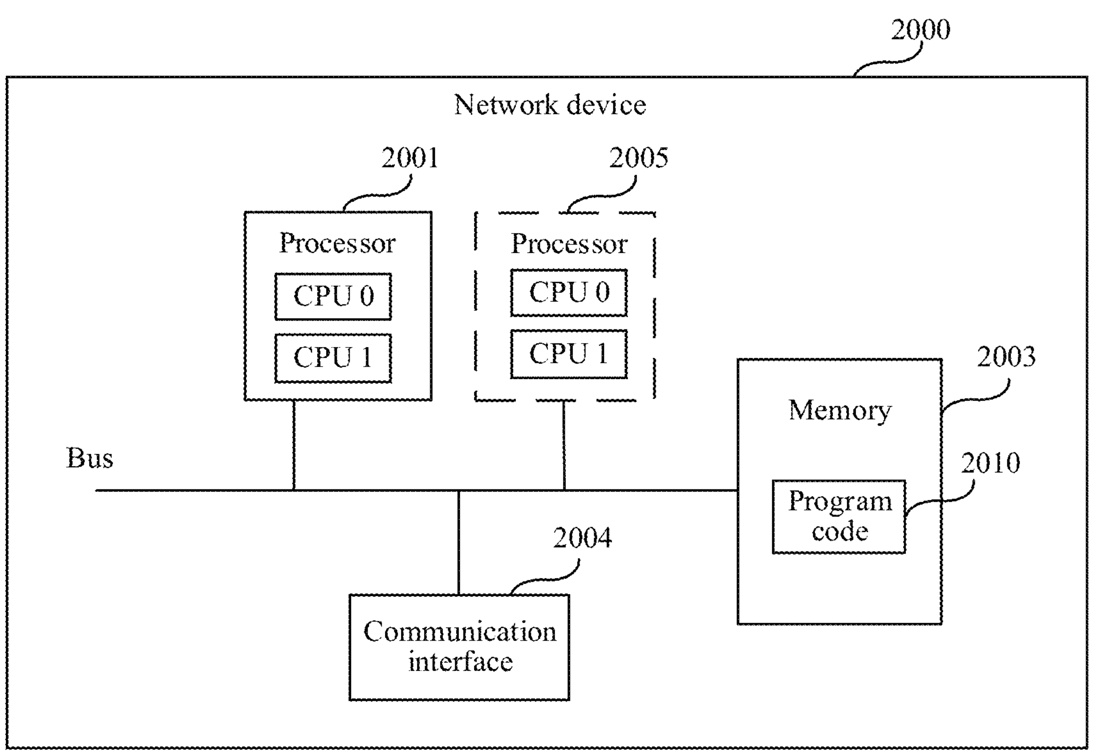
FIG. 16 is a schematic diagram of a structure of a network device according to an embodiment of this application.

FIG. 16 is a schematic diagram of a structure of a network device 2000 according to an example embodiment of this application. The network device 2000 shown in FIG. 16 is configured to perform an operation related to the packet transmission method shown in FIG. 8. The network device 2000 is, for example, a switch or a router, and the network device 2000 may be implemented by using a general bus architecture.

As shown in FIG. 16, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in embodiments of the present disclosure. Alternatively, the processor may be a combination of processors implementing a computing function, for example, a combination of one or more microprocessors, or a combination of a DSP and a microprocessor.

In an embodiment, the network device 2000 further includes a bus. The bus is configured to transmit or receive information between components of the network device 2000. The bus may be a peripheral component interconnect (PCI) bus, an extended industry standard architecture (EISA) bus, or the like. The bus may be classified into an address bus, a data bus, a control bus, and the like. For ease of representation, only one thick line is for representing the bus in FIG. 16, but this does not mean that there is only one bus or only one type of bus.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 may be integrated with the processor 2001.

The communication interface 2004 is configured to communicate with another device or a communication network by using any transceiver-type apparatus. The communication network may be the Ethernet, a radio access network (RAN), a wireless local area network (WLAN), or the like. The communication interface 2004 may include a wired communication interface, and may further include a wireless communication interface. In an embodiment, the communication interface 2004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with the another device.

In an embodiment, the processor 2001 may include one or more CPUs, for example, a CPU 0 and a CPU 1 shown in FIG. 16. Each of the processors may be a single-core (single-CPU) processor, or may be a multi-core (multi-CPU) processor. The processor herein may be one or more devices, circuits, and/or processing cores configured to process data (for example, computer program instructions).

In an embodiment, the network device 2000 may include a plurality of processors, for example, the processor 2001 and a processor 2005 shown in FIG. 16. Each of the processors may be a single-core (single-CPU) processor, or may be a multi-core (multi-CPU) processor. The processor herein may be one or more devices, circuits, and/or processing cores configured to process data (for example, computer program instructions).

In an embodiment, the network device 2000 may further include an output device and an input device. The output device communicates with the processor 2001, and may display information in a plurality of manners. For example, the output device may be a liquid crystal display (LCD), a light-emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensor device.

In some embodiments, the memory 2003 is configured to store program code 2010 for performing the solutions of this application, and the processor 2001 may execute the program code 2010 stored in the memory 2003. In other words, the network device 2000 may implement, by using the processor 2001 and the program code 2010 in the memory 2003, the packet transmission method provided in the method embodiments. The program code 2010 may include one or more software modules. In an embodiment, the processor 2001 may also store program code or instructions for performing the solutions of this application.

In an embodiment, the network device 2000 in this embodiment of this application may correspond to the first network device in the foregoing method embodiments, and the processor 2001 in the network device 2000 reads instructions in the memory 2003, so that the network device 2000 shown in FIG. 16 can perform all or a part of operations performed by the first network device.

In an embodiment, the processor 2001 is configured to obtain, by a second master port of the network device, a second dataset by using the communication interface.

For brevity, another optional implementation is not described herein again.

The network device 2000 may further correspond to the packet transmission apparatuses shown in FIGS. 12 to 15, and each function module in the packet transmission apparatuses is implemented by using software of the network device 2000. In other words, the functional modules included in the apparatuses are generated after the processor 2001 of the network device 2000 reads the program code 2010 stored in the memory 2003.

The operations of the packet transmission method shown in FIG. 8 are implemented by using an integrated logic circuit of hardware in the processor of the network device 2000, or by using instructions in a form of software. The operations of the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and performs the operations in the foregoing methods in combination with the hardware in the processor. To avoid repetition, details are not described herein again.

Figure 17:
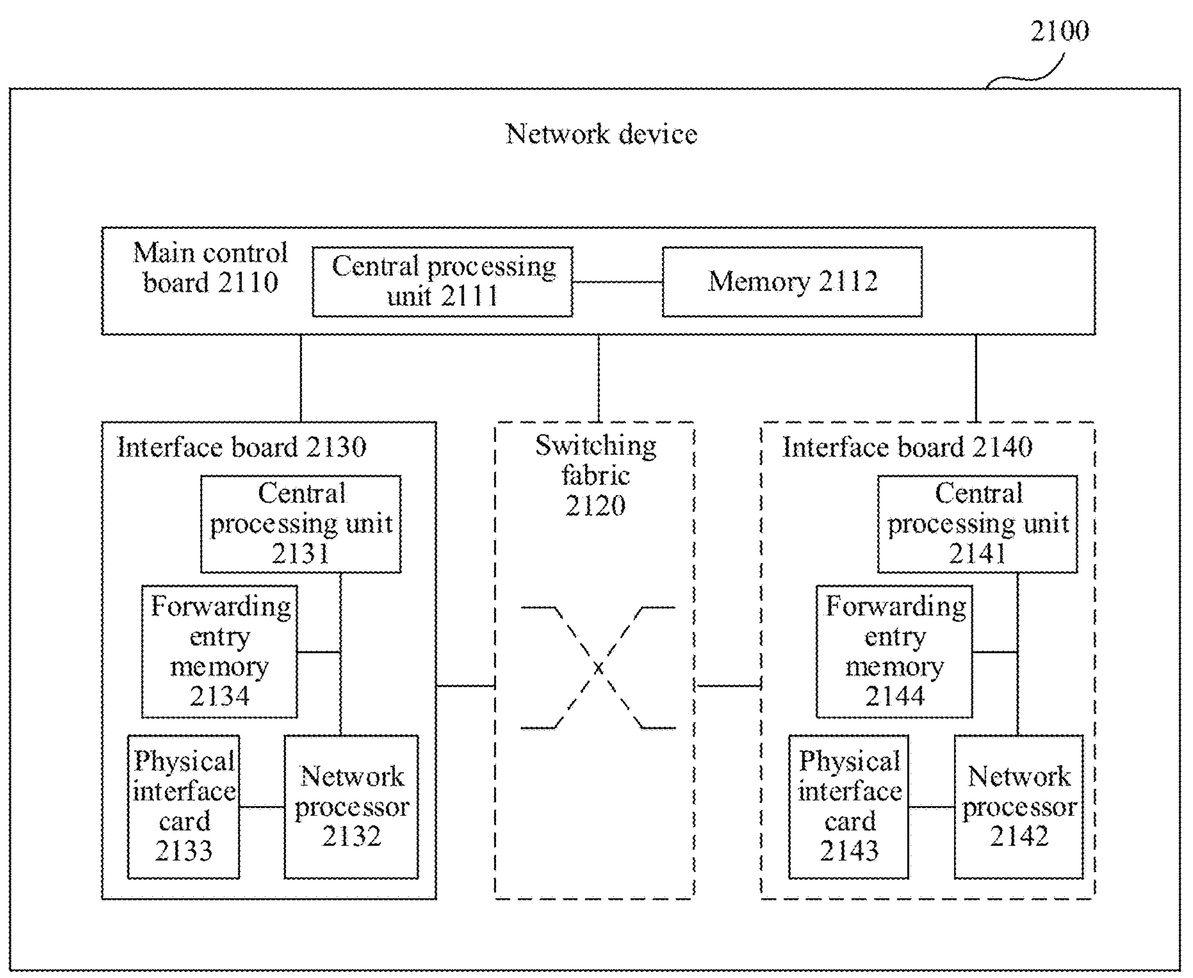
FIG. 17 is a schematic diagram of a structure of a network device according to an embodiment of this application.

FIG. 17 is a schematic diagram of a structure of a network device 2100 according to another example embodiment of this application. The network device 2100 shown in FIG. 17 is configured to perform all or a part of operations in the packet transmission method shown in FIG. 8. The network device 2100 is, for example, a switch or a router, and the network device 2100 may be implemented by using a general bus architecture.

As shown in FIG. 17, the network device 2100 includes a main control board 2110 and an interface board 2130.

The main control board is also referred to as a main processing unit (MPU) or a route processor card. The main control board 2110 is configured to control and manage components in the network device 2100, including route computation, device management, device maintenance, and a protocol processing function. The main control board 2110 includes: a central processing unit 2111 and a memory 2112.

The interface board 2130 is also referred to as a line processing unit (LPU), a line card, or a service board. The interface board 2130 is configured to provide various service interfaces, and forward a data packet. The service interface includes, but is not limited to, an Ethernet interface, a POS (Packet over SONET/SDH) interface, and the like. The Ethernet interface is, for example, a flexible Ethernet service interface (Flexible Ethernet Client, FlexE Client). The interface board 2130 includes a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field-programmable gate array (FPGA). In an embodiment, the network processor 2132 is configured to forward a received packet based on a forwarding table stored in the forwarding entry memory 2134. If a destination address of the packet is an address of the network device 2100, the network processor 2132 sends the packet to a CPU (for example, the central processing unit 2131) for processing. If a destination address of the packet is not an address of the network device 2100, the network processor 2132 finds, based on the destination address, a next hop and an outbound interface that correspond to the destination address in the forwarding table, and forwards the packet to the outbound interface corresponding to the destination address. Processing on an uplink packet may include processing at a packet inbound interface and forwarding table lookup, and processing on a downlink packet may include forwarding table lookup and the like. In some embodiments, the central processing unit may alternatively perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be mounted on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

In an embodiment, the network device 2100 includes a plurality of interface boards. For example, the network device 2100 further includes an interface board 2140, and the interface board 2140 includes: a central processing unit 2141, a network processor 2142, a forwarding entry memory 2144, and a physical interface card 2143. Functions and implementations of components in the interface board 2140 are the same as or similar to those of the interface board 2130, and details are not described herein again.

In an embodiment, the network device 2100 further includes a switch fabric 2120. The switch fabric 2120 may also be referred to as a switch fabric unit (SFU). When the network device has the plurality of interface boards, the switch fabric 2120 is configured to complete data exchange between the interface boards. For example, the interface board 2130 and the interface board 2140 may communicate with each other by using the switch fabric 2120.

The main control board 2110 is coupled to the interface board. For example, the main control board 2110, the interface board 2130, the interface board 2140, and the switch fabric 2120 are connected to a system backboard by using a system bus for interworking. In an embodiment, inter-process communication (IPC) channels are established between the main control board 2110 and the interface board 2130 and between the main control board 2110 and the interface board 2140, and communication between the main control board 2110 and the interface board 2130 and between the main control board 2110 and the interface board 2140 is performed through the IPC channels.

Logically, the network device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs functions such as a router, generating a forwarding table, processing signaling and a protocol packet, configuring and maintaining a network device status. The control plane delivers the generated forwarding table to the forwarding plane. On the forwarding plane, the network processor 2132 looks up the forwarding table delivered by the control plane, and forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include a primary main control board and a secondary main control board. There may be one or more interface boards. The network device having a stronger data processing capability provides more interface boards. There may also be one or more physical interface cards on the interface board. There may be no switch fabric or one or more switch fabrics. When there are a plurality of switch fabrics, load sharing and redundancy backup may be implemented together. In a centralized forwarding architecture, the network device may not need the switch fabric, and the interface board provides a function of processing service data in the entire system. In a distributed forwarding architecture, the network device may have at least one switch fabric, and the data exchange between the plurality of interface boards is implemented by using the switch fabric, to provide a large-capacity data exchange and processing capability. Therefore, a data access and processing capability of the network device in the distributed architecture is better than that of the network device in the centralized architecture. In an embodiment, the network device may alternatively be in a form in which there is only one card. In an embodiment, there is no switch fabric, and functions of the interface board and the main control board are integrated on the card. In this case, the central processing unit on the interface board and the central processing unit on the main control board may be combined to form one central processing unit on the card, to perform functions obtained by combining the two central processing units. In the form, the network device (for example, the network device such as a low-end switch or a router) has a weak data exchange and processing capability. An architecture that is to be used depends on a networking deployment scenario. This is not limited herein.

In an embodiment, the network device 2100 corresponds to the packet transmission apparatuses that are used in the network device and that are shown in FIGS. 12 to 15. In some embodiments, the first obtaining module 1201 in the packet transmission apparatuses shown in FIGS. 12 to 15 is equivalent to the network processor 2132 in the network device 2100, and the sending module 1202 is equivalent to the physical interface card 2133 in the network device 2100.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the methods that need to be performed by a network device.

The foregoing processor may be a CPU, or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and the volatile memory is used as an external cache. By way of example, and not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

An embodiment of this application further provides a computer-readable storage medium. The storage medium stores at least one instruction, and the instruction is loaded and executed by a processor, to enable a computer to implement any one of the foregoing packet transmission methods.

An embodiment of this application further provides a computer program (product). When the computer program is executed by a computer, a processor or the computer is enabled to perform the corresponding operations and/or procedures in the foregoing method embodiments.

An embodiment of this application further provides a chip, including a processor. The processor is configured to invoke, from a memory, instructions stored in the memory and run the instructions, to enable a communication device on which the chip is mounted to perform any one of the foregoing packet transmission methods.

An embodiment of this application further provides another chip, including an input interface, an output interface, a processor, and a memory. The input interface, the output interface, the processor, and the memory are connected to each other through an internal connection path. The processor is configured to execute code in the memory, and when the code is executed, the processor is configured to perform any one of the foregoing packet transmission methods.

All or a part of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on the computer, the procedure or functions according to this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may be aware that, with reference to embodiments disclosed in this specification, the method operations and the modules can be implemented by using software, hardware, firmware, or any combination thereof. To clearly describe the interchangeability between the hardware and the software, the operations and composition of each embodiment have been generally described in the foregoing specification based on functions. Whether these functions are executed in a hardware or software manner depends on an application and a design constraint condition of the technical solutions. A person of ordinary skill in the art may use different methods to implement the described functions for each particular application, but it should not be considered that the implementation goes beyond the scope of this application.

A person of ordinary skill in the art may understand that all or a part of the operations of embodiments may be implemented by hardware or a program instructing related hardware. The program may be stored in a computer-readable storage medium. The foregoing mentioned storage medium may include a read-only memory, a magnetic disk, an optical disc, or the like.

When software is used to implement embodiments, all or a part of embodiments may be implemented in a form of a computer program product. The computer program product includes one or more computer program instructions. For example, the method in embodiments of this application may be described in a context of a machine-executable instruction. The machine-executable instruction is included in, for example, a program module executed in a device on a real or virtual processor of a target. Usually, the program module includes a routine, a program, a library, an object, a class, a component, a data structure, and the like, and executes a task or implements an abstract data structure. In various embodiments, functions of program modules may be combined or split between the described program modules. The machine-executable instruction for the program module may be executed locally or within a distributed device. In the distributed device, the program module may be located in both a local storage medium and a remote storage medium.

Computer program code used to implement the method in embodiments of this application may be written in one or more programming languages. The computer program code may be provided for a processor of a general-purpose computer, a special-purpose computer, or another programmable data processing apparatus, so that when the program code is executed by the computer or the another programmable data processing apparatus, functions/operations specified in the flowcharts and/or block diagrams are implemented. The program code may be executed all on a computer, partially on the computer, as an independent software package, partially on the computer and partially on a remote computer, or all on the remote computer or server.

In a context of embodiments of this application, the computer program code or related data may be carried by any appropriate carrier, so that a device, an apparatus, or a processor can perform various processing and operations described above. For example, the carrier includes a signal, a computer-readable medium, and the like.

For example, the signal may include propagating signals in electrical, optical, radio, sound, or other forms, such as carrier waves and infrared signals.

The machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any appropriate combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

It may be clearly understood by a person skilled in the art that, for convenient and brief description, for a detailed working process of the foregoing system, device, and module, refer to a corresponding process in the foregoing method embodiments. Details are not described herein.

In several embodiments provided in this application, it should be understood that the disclosed system, device, and method may be implemented in another manner. For example, the described device embodiment is merely an example. For example, the module division is merely logical function division and may be other division during actual implementation. For example, a plurality of modules or components may be combined or integrated into another system, or some features may be omitted or not performed. In addition, the displayed or discussed mutual couplings or direct couplings or communication connections may be through some interfaces, and the indirect couplings or communication connections of the devices or modules may be in an electrical, mechanical, or another form.

The modules described as separate parts may or may not be physically separate, and parts displayed as modules may or may not be physical modules, may be located in one position, or may be distributed on a plurality of network modules. A part or all of the modules may be selected based on an actual requirement to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of the software functional module and sold or used as an independent product, the integrated module may be stored in a computer-readable storage medium. Based on such an understanding, the technical solutions of this application essentially, or the part contributing to the related art, or all or a part of the technical solutions may be implemented in the form of the software product. The computer software product is stored in a storage medium and includes several instructions to enable a computer device (which may be a personal computer, a server, a network device, or the like) to perform all or a part of the operations of the methods in embodiments of this application. The foregoing storage medium includes media such as a USB flash drive, a removable hard disk, a read-only memory (ROM), a random access memory (RAM), a magnetic disk, an optical disc, or the like, that can store program code.

In this application, the terms "first", "second", and the like are used to distinguish between same or similar items whose effects and functions are basically the same. It should be understood that there is no logical or time-sequence dependency among "first", "second", and "$n^{th}$", and a quantity and an execution sequence are not limited. It should also be understood that although the terms such as "first" and "second" are used in the following description to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in response to determining", or "in response to detecting". Similarly, based on the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined only based on A, but B may be determined based on A and/or other information.

It should further be understood that "one embodiment", "an embodiment", or "a possible implementation" mentioned throughout this specification means that particular features, structures, or characteristics related to embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any suitable manner.

The foregoing descriptions are merely optional embodiments of this application, but are not intended to limit this application. Any modification, equivalent replacement, or improvement made without departing from the principle of this application should fall within the protection scope of this application.

What is claimed is:

1. A packet transmission method, wherein the method comprises:

in response to determining that a second slave port of a network device is invalid or the second slave port does not exist, obtaining, by a second master port of the network device, a second dataset by modifying a first dataset that comprises a timestamp carried in a first clock packet sent by a third master port and received by a first slave port and data generated by the first slave port based on the first clock packet, wherein the first slave port belongs to a first clock domain, and the second master port belongs to a second clock domain that has a different domainNumber from the first clock domain; and sending, by the network device, a second clock packet based on the second dataset through the second master port, wherein a timestamp carried in the second clock packet is the timestamp carried in the first clock packet, and the first clock packet and the second clock packet each comprises a synchronization sync packet or a follow-up packet in a precision time protocol.

2. The method according to claim 1, wherein the obtaining the second dataset further comprises:

receiving, by the second master port, the first dataset; and modifying the first dataset based on information about the second clock domain to obtain the second dataset.

3. The method according to claim 2, wherein the first dataset comprises a domainNumber, the modifying further comprising:

modifying a value of the domain Number of the first dataset to a domainNumber of the second clock domain.

4. The method according to claim 2, wherein the first dataset comprises a domain name, a local port number, a synchronization receipt time, a source port identity, and a log message interval, the modifying further comprising:

modifying a value of the domain name of the first dataset to a domain name of the second clock domain;

modifying a value of the local port number to a first value;

modifying a value of the synchronization receipt time to a second value;

modifying a clock identity in the source port identity to a clock identity of the second clock domain;

modifying a port number in the source port identity to a third value; and modifying the log message interval to a time interval at which a ClockMaster of the second clock domain sends a packet.

5. The method according to claim 1, wherein an interworking function (IWF) is comprised between the second master port and the first slave port, the method further comprising:

modifying, by the IWF, the first dataset based on information about the second clock domain to obtain the second dataset; and receiving, by the second master port, the second dataset sent by the IWF.

6. The method according to claim 1, wherein the network device comprises a second switch, the method further comprising:

obtaining, by the second master port, the second dataset based on control of the second switch and the first dataset corresponding to the first slave port.

7. The method according to claim 6, wherein the network device further comprises a first switch, and a first master port belongs to the first clock domain, the method further comprising:

in response to determining that the first slave port exists and is valid, sending, by the first master port, a fourth clock packet based on control of the first switch and the first dataset corresponding to the first slave port, wherein the fourth clock packet comprises a sync packet or a follow_up packet in the precision time protocol; and in response to determining that the first slave port is invalid or the first slave port does not exist, and the second slave port exists and is valid, sending, by the first master port, a fifth clock packet based on a control of the first switch and a third dataset corresponding to the second slave port, wherein the fifth clock packet comprises a sync packet or a follow_up packet in the precision time protocol.

8. The method according to claim 1, wherein the network device comprises a second switch, the method further comprising:

in response to determining that the second slave port exists and is valid, and the second slave port belongs to the second clock domain, sending, by the second master port, a third clock packet based on a control of the second switch and a third dataset corresponding to the second slave port, wherein the third clock packet comprises a sync packet or a follow_up packet in the precision time protocol.

9. The method according to claim 1, wherein before the obtaining, the method further comprises:

receiving, by the first slave port, the first clock packet sent by the third master port, wherein the third master port corresponds to the first clock domain of a clock source device of the network device;

obtaining, based on the received first clock packet, the data generated based on the first clock packet; and generating the first dataset based on the timestamp carried in the first clock packet and the data generated based on the first clock packet.

10. A packet transmission apparatus, comprising:

a processor;

a memory storing program instructions, which, when executed by the processor, cause the apparatus to:

in response to determining that a second slave port of a network device is invalid or the second slave port does not exist, obtain, by a second master port of the network device, a second dataset by modifying a first dataset that comprises a timestamp carried in a first clock packet sent by a third master port and received by a first slave port and data generated by the first slave port based on the first clock packet, wherein the first slave port belongs to a first clock domain, and the second master port belongs to a second clock domain that has a different domainNumber from the first clock domain; and send a second clock packet based on the second dataset through the second master port, wherein a timestamp carried in the second clock packet is the timestamp carried in the first clock packet, and the first clock packet and the second clock packet each comprises a synchronization sync packet or a follow-up packet in a precision time protocol.

11. The apparatus according to claim 10, wherein the program instructions further cause the apparatus to:

receive, by the second master port, the first dataset; and modify the first dataset based on information about the second clock domain, to obtain the second dataset.

12. The apparatus according to claim 11, wherein the first dataset comprises a domainNumber, and wherein the apparatus is further configured to:

modify a value of the domain Number of the first dataset to a domainNumber of the second clock domain of the network device.

13. The apparatus according to claim 11, wherein the first dataset comprises a domain name, a local port number, a synchronization receipt time, a source port identity, and a log message interval; and the apparatus is further configured to:

modify a value of the domain name of the first dataset to a domain name of the second clock domain;

modify a value of the local port number to a first value;

modify a value of the synchronization receipt time to a second value;

modify a clock identity in the source port identity to a clock identity of the second clock domain;

modify a port number in the source port identity to a third value; and modify the log message interval to a time interval at which a ClockMaster of the second clock domain sends a packet.

14. The apparatus according to claim 10, wherein an interworking function (IWF) is comprised between the second master port and the first slave port, the apparatus further configured to:

modify, by the IWF, the first dataset based on information about the second clock domain to obtain the second dataset; and receive, by the second master port, the second dataset sent by the IWF.

15. The apparatus according to claim 10, wherein the network device comprises a second switch; and wherein the apparatus is further configured to:

obtain, by the second master port, the second dataset based on control of the second switch and the first dataset corresponding to the first slave port.

16. The apparatus according to claim 15, wherein the network device further comprises a first switch, a first master port belongs to the first clock domain, and wherein the apparatus is further configured to:

in response to determining that the first slave port exists and is valid, send, by the first master port, a fourth clock packet based on control of the first switch and the first dataset corresponding to the first slave port, wherein the fourth clock packet comprises a sync packet or a follow_up packet in the precision time protocol; and in response to determining that the first slave port is invalid or the first slave port does not exist, and the second slave port exists and is valid, send, by the first master port, a fifth clock packet based on a control of the first switch and a third dataset corresponding to the second slave port, wherein the fifth clock packet comprises a sync packet or a follow_up packet in the precision time protocol.

17. The apparatus according to claim 10, wherein the network device comprises a second switch, and wherein the apparatus is further configured to:

in response to determining that the second slave port exists and is valid, and the second slave port belongs to the second clock domain, send, by the second master port, a third clock packet based on a control of the second switch and a third dataset corresponding to the second slave port, wherein the third clock packet comprises a sync packet or a follow_up packet in the precision time protocol.

18. The apparatus according to claim 10, wherein the apparatus is further configured to:

receive, by the first slave port, the first clock packet sent by the third master port, wherein the third master port corresponds to the first clock domain of a clock source device of the network device;

obtain, based on the received first clock packet, the data generated based on the first clock packet; and generate the first dataset based on the timestamp carried in the first clock packet and the data generated based on the first clock packet.

19. A non-transitory computer-readable storage medium, wherein the storage medium stores at least one instruction, and the at least one instruction is loaded and executed by a processor, to enable a computer to:

in response to determining that a second slave port of a network device is invalid or the second slave port does not exist, obtain, by a second master port of the network device, a second dataset by modifying a first dataset that comprises a timestamp carried in a first clock packet sent by a third master port and received by a first slave port and data generated by the first slave port based on the first clock packet, wherein the first slave port belongs to a first clock domain, and the second master port belongs to a second clock domain that has a different domainNumber from the first clock domain; and send a second clock packet based on the second dataset through the second master port, wherein a timestamp carried in the second clock packet is the timestamp carried in the first clock packet, and the first clock packet and the second clock packet each comprises a synchronization sync packet or a follow-up packet in a precision time protocol.

20. The non-transitory computer-readable storage medium of claim 19, wherein the computer is further to:

receive, by the second master port, the first dataset; and modify the first dataset based on information about the second clock domain to obtain the second dataset.

* * * * *